(12) United States Patent
Sekiguchi et al.

(10) Patent No.: US 6,628,270 B2
(45) Date of Patent: Sep. 30, 2003

(54) COORDINATE INPUT APPARATUS

(75) Inventors: Hidenori Sekiguchi, Kawasaki (JP); Soichi Hama, Kawasaki (JP); Akira Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 09/902,103

(22) Filed: Jul. 11, 2001

(65) Prior Publication Data

US 2002/0060665 A1 May 23, 2002

(30) Foreign Application Priority Data

Nov. 17, 2000 (JP) ........................................ 2000-351760
Apr. 23, 2001 (JP) ........................................ 2001-124908

(51) Int. Cl.$^7$ ................................................ G09G 5/00
(52) U.S. Cl. .................... 345/173; 345/175; 345/177; 345/179; 178/18.04; 178/19.02
(58) Field of Search ................................ 345/173, 175, 345/179–183, 177; 178/18.01–18.09, 19.01–19.07

(56) References Cited

U.S. PATENT DOCUMENTS

| | | | | |
|---|---|---|---|---|
| 4,814,552 A | * | 3/1989 | Stefik et al. ............. | 178/19.02 |
| 5,627,348 A | * | 5/1997 | Berkson et al. .......... | 178/19.04 |
| 5,635,682 A | * | 6/1997 | Cherdak et al. ......... | 178/19.01 |
| 5,637,839 A | * | 6/1997 | Yamaguchi et al. ..... | 178/18.04 |
| 5,717,168 A | * | 2/1998 | DeBuisser et al. ....... | 178/18.04 |
| 5,939,702 A | * | 8/1999 | Knighton et al. ....... | 235/472.03 |
| 6,208,330 B1 | * | 3/2001 | Hasegawa et al. ......... | 345/173 |

FOREIGN PATENT DOCUMENTS

JP 9-179684 7/1997

* cited by examiner

*Primary Examiner*—Regina Liang
(74) *Attorney, Agent, or Firm*—Staas & Halsey LLP

(57) ABSTRACT

In the present invention, two ultrasonic receivers are provided in common for plural input planes, and the plural input planes are restricted to a plane not perpendicular to a line connecting the two ultrasonic receivers, so that the sufficiently practicable coordinate input device can be provided. When the line connecting two ultrasonic receivers is perpendicular to the input plane, the distances from the input device to the two ultrasonic receivers exist in plural sets, so that the coordinates of an input device cannot be specified. Furthermore, in order to acquire the coordinates of the input device by the two ultrasonic receivers, a positional relations between the two ultrasonic receivers and the input planes are made initial setting in advance. When set in advance, it is possible to acquire the position of the input devices in the plural input planes from the distance from input device to two ultrasonic receivers.

20 Claims, 36 Drawing Sheets

For S1

For S2, S3

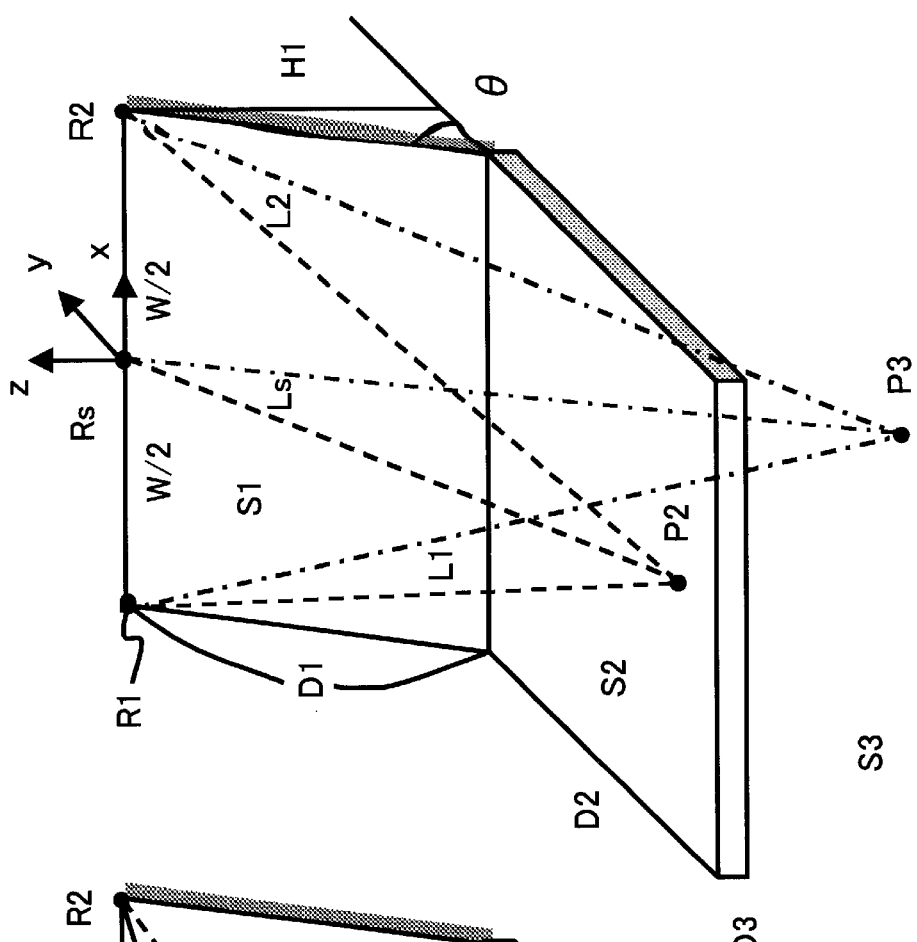
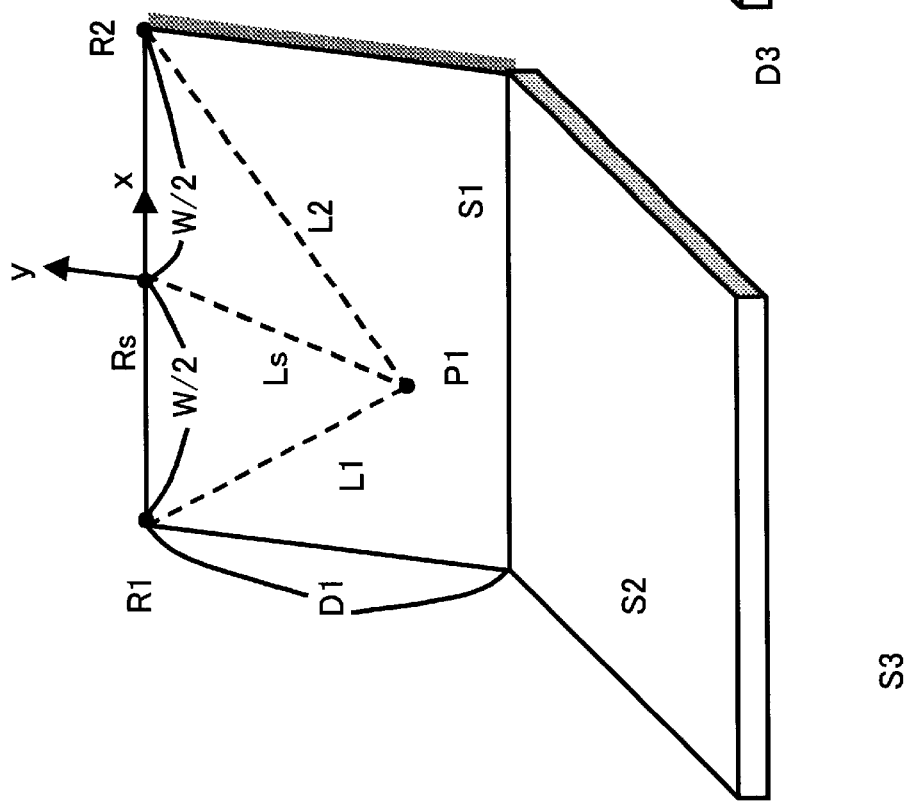

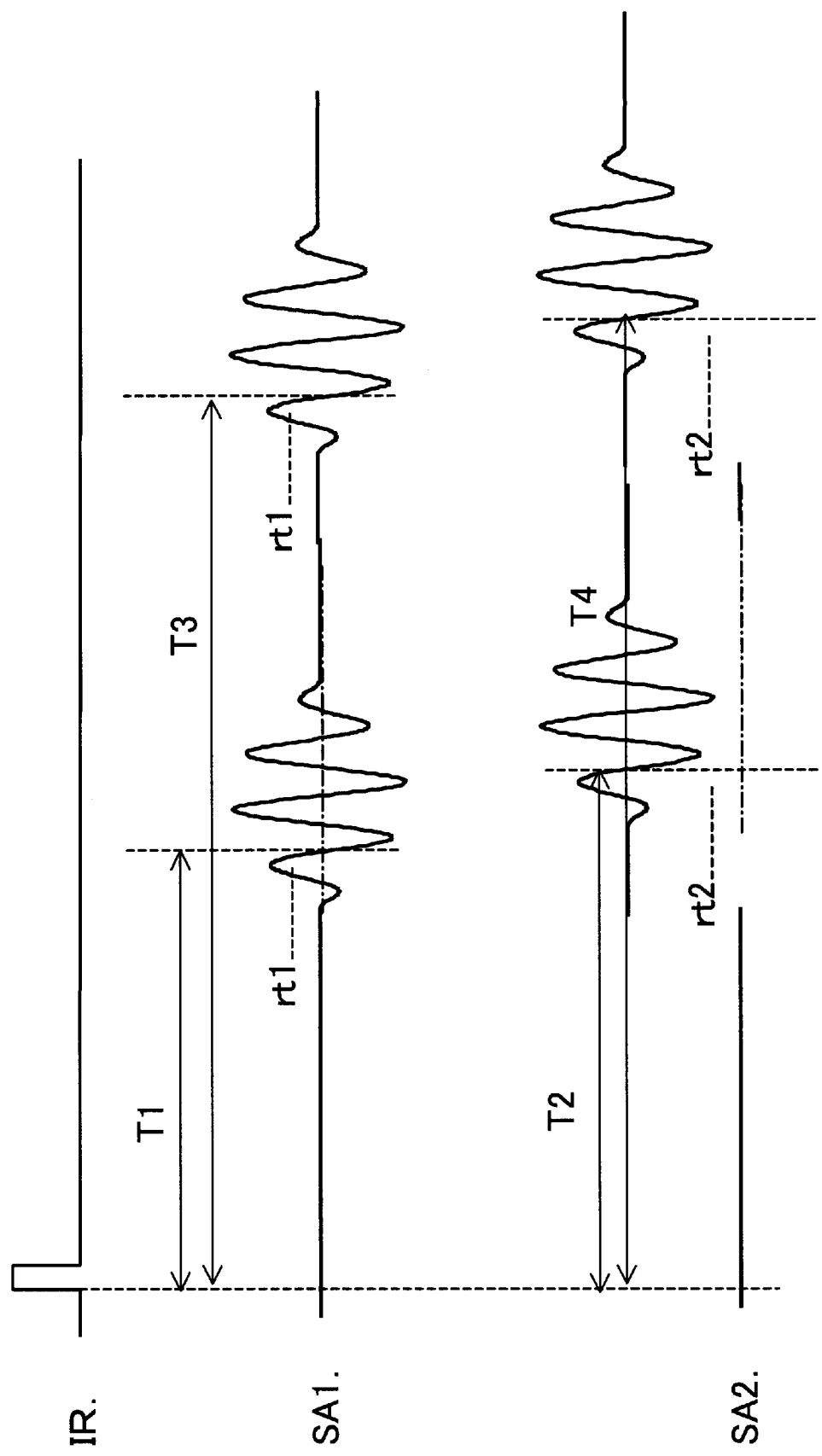

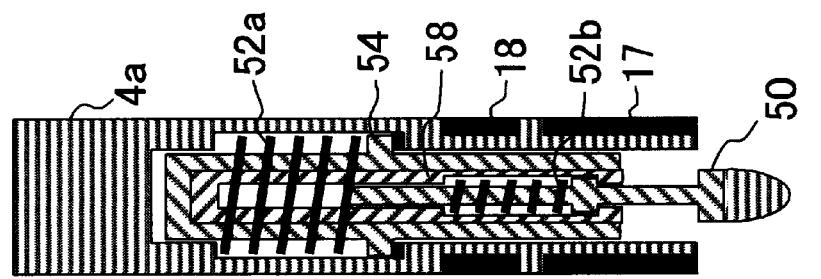
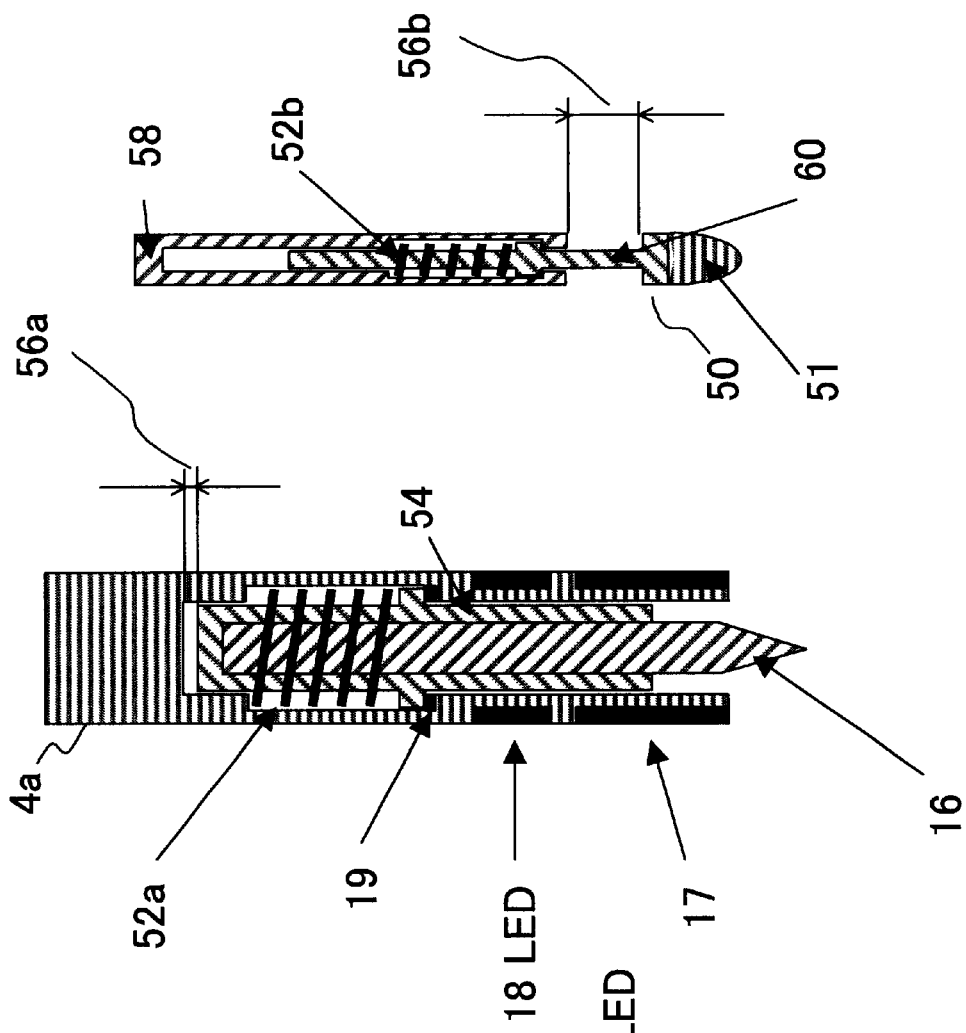
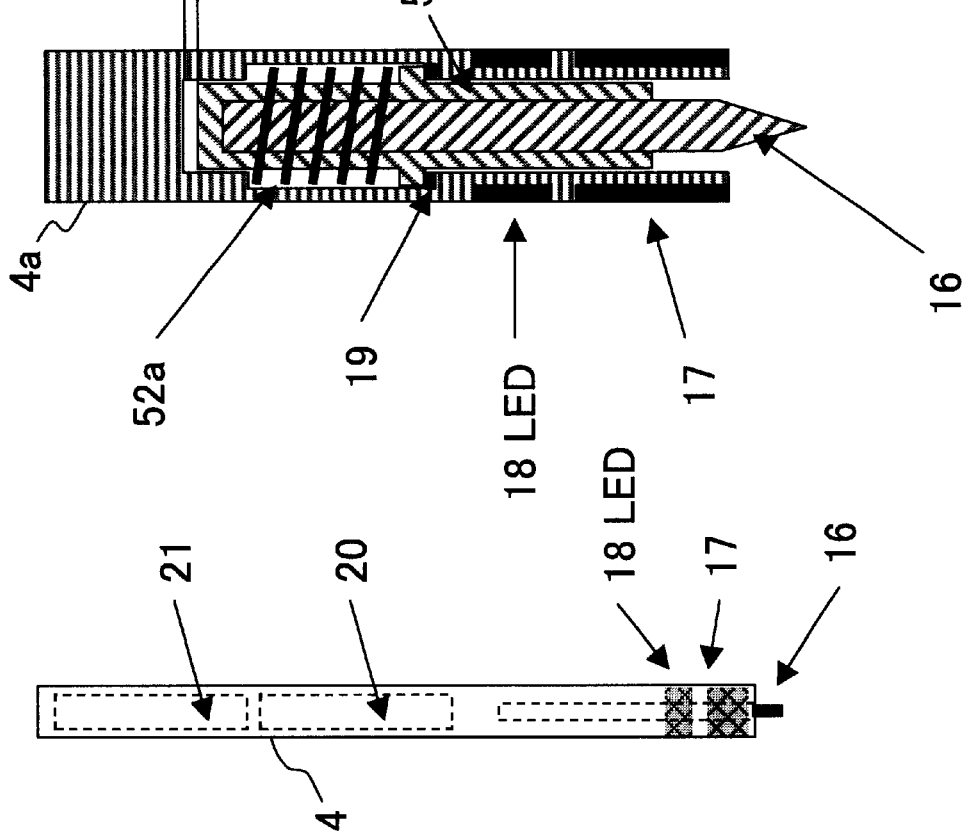

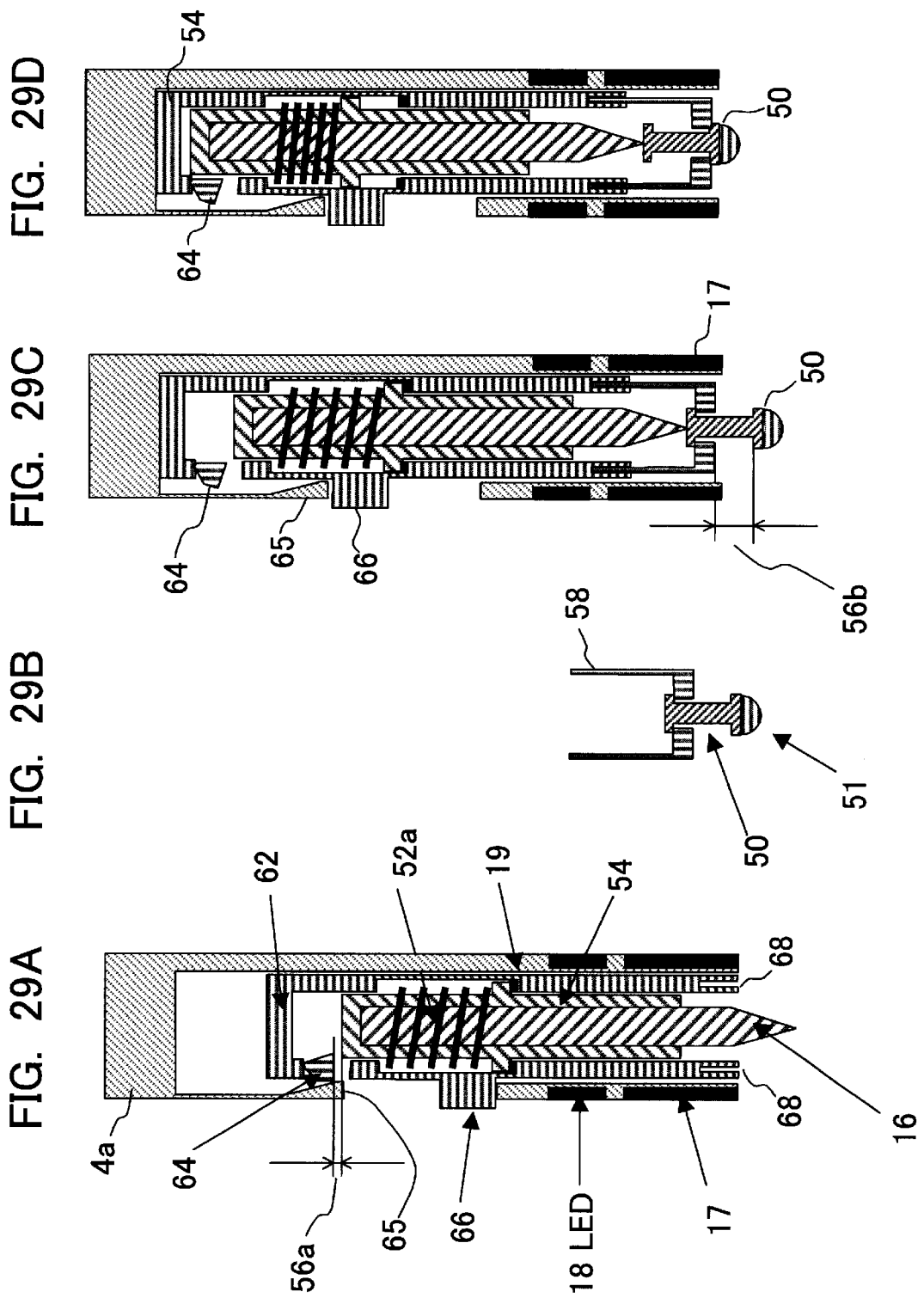

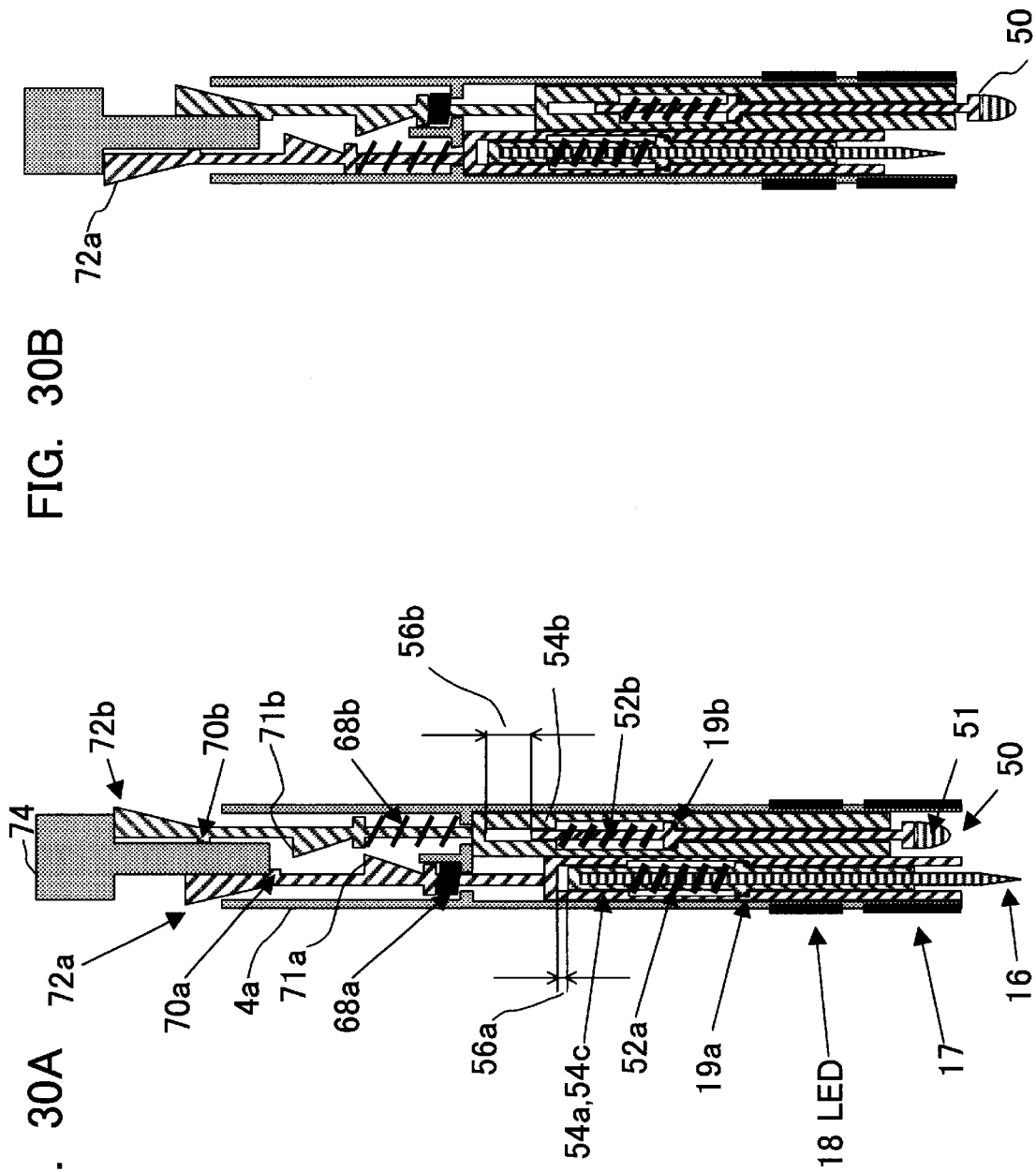

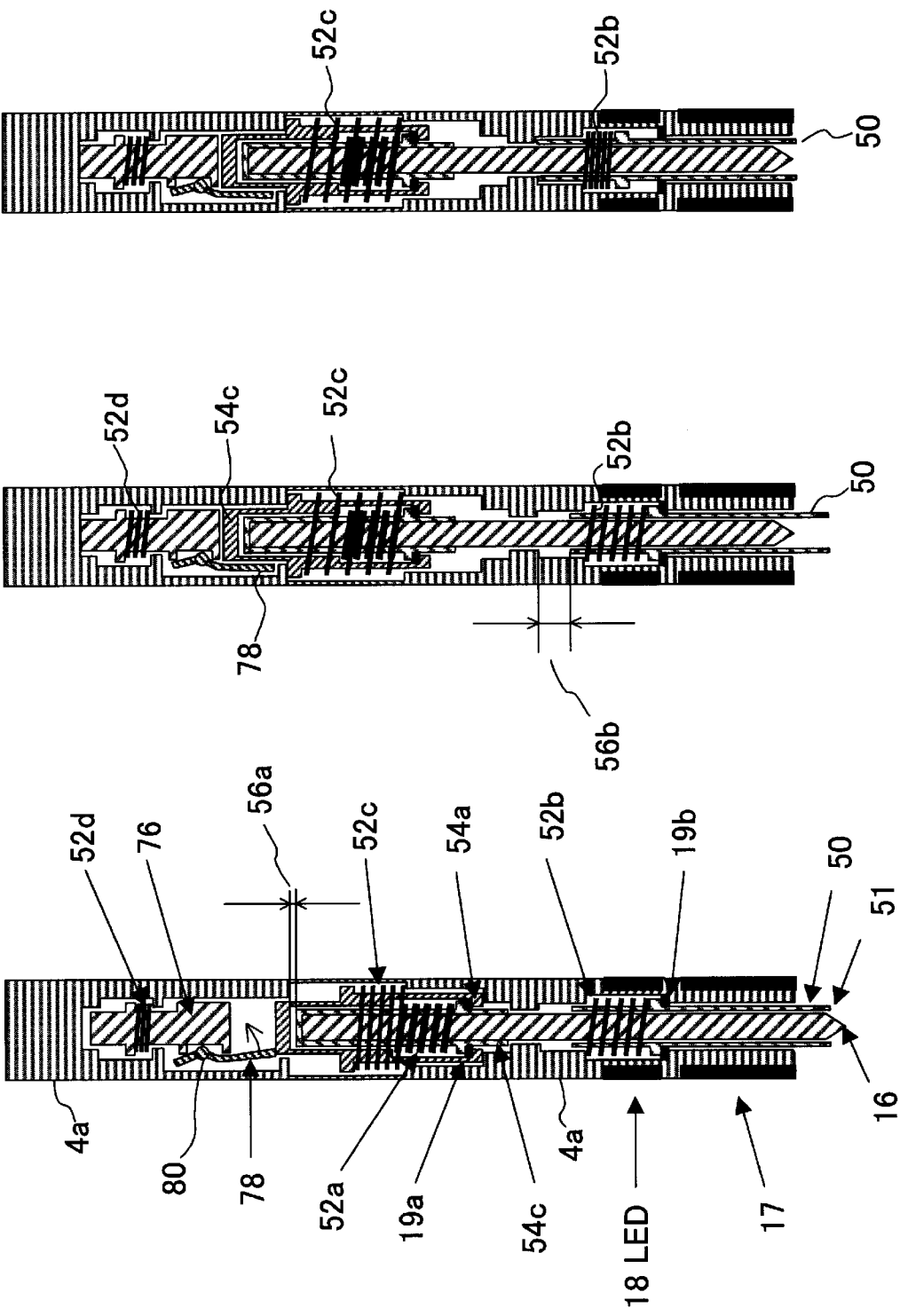

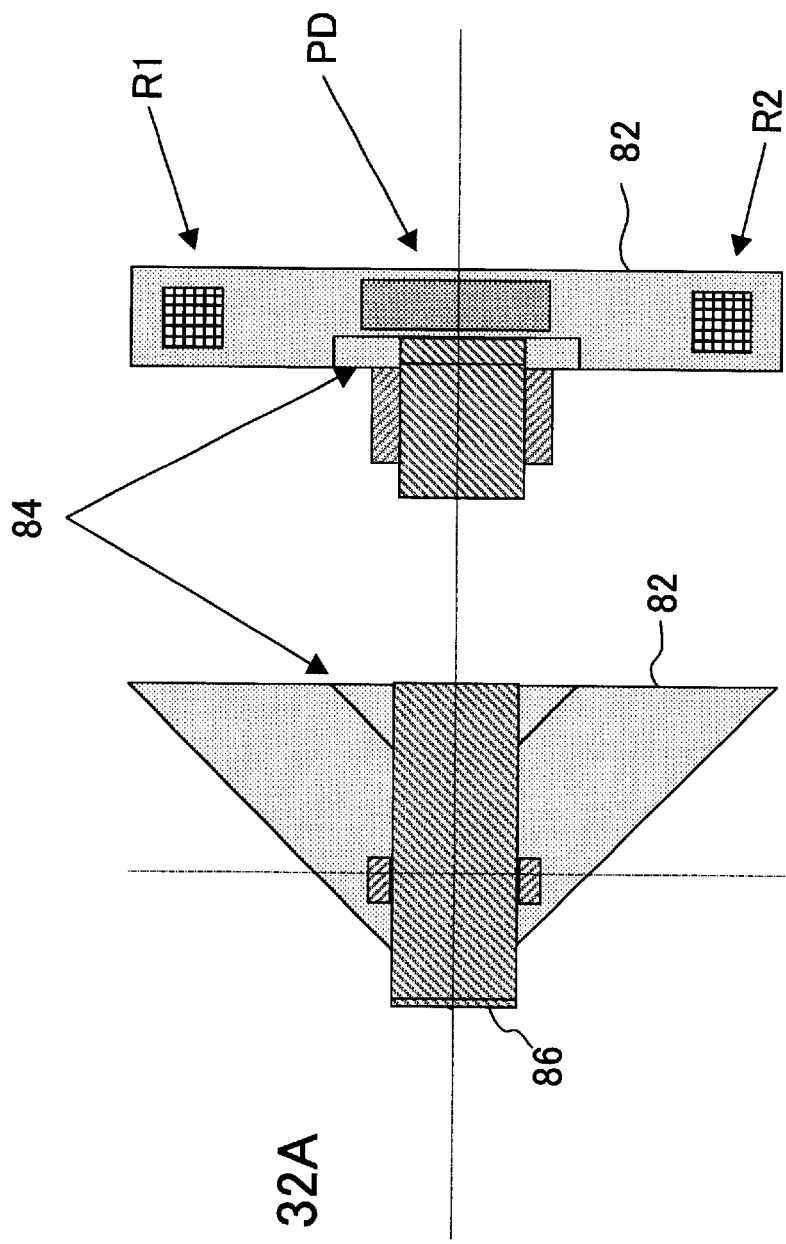
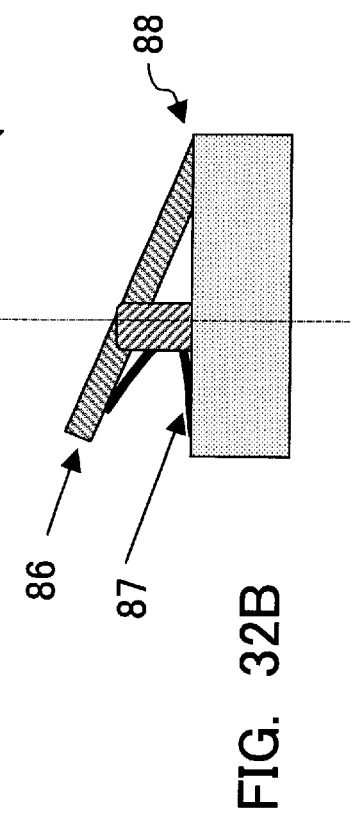
FIG. 32A
FIG. 32B
FIG. 32C

COORDINATE INPUT APPARATUS

BACKGROUND OF THE INVENTION

1. Field of the Invention

The present invention relates to a coordinate input device utilizing ultrasonic waves for designating a position on a screen and inputting a locus of writing characters, graphics or the like in a computer system.

2. Description of the Related Arts

As a coordinate input device for designating a position on a screen of a computer, and inputting a locus of writing characters, graphics, or the like, the coordinates input devices utilizing various principles have been proposed. The coordinate input device utilizing ultrasonic waves among them generates ultrasonic waves from an input pen, receives the ultrasonic waves by a plurality of receivers, acquires a distance of the plurality of receivers and the input pen from an ultrasonic propagation time required from the input pen to the receivers and an ultrasonic speed, calculates the coordinate of the input pen, and inputs it into a computer.

In such the coordinate input device utilizing ultrasonic waves, a special configuration is not required to provide on an input plane unlike a touch panel of a resistive film system or an electromagnetic induction-type, and it is possible to input coordinates from various input planes such as a display screen of the computer, or a paper on a desk, a black board, or the like.

The proposed coordinate input device utilizing ultrasonic waves is provided with at least two receivers on the input plane, receives ultrasonic waves transmitted from the input pen in the input plane in synchronism with a certain synchronous signal by the two receivers, and acquires a coordinate in the input plane from each distance. Accordingly, it is necessary that the two receivers are provided on the input planes, respectively.

Furthermore, for example, as described in Japanese Patent Application Laid-Open No. 9-179684 (laid open on Jul. 11, 1997), three ultrasonic receivers are in common provided, to detect a coordinate value in a three-dimensional space of the input pen, so that the coordinate is input by distinguishing inputs from a plurality of input planes, respectively. This coordinate input device utilizing ultrasonic waves allows to input coordinates from arbitrary input plane.

However, the aforementioned coordinate input device utilizing ultrasonic waves requires three ultrasonic receivers in order to permit inputs from the plurality of input planes positioned in the three-dimensional space. In the aforementioned prior art, in order to allow the coordinate input from various input planes, it is necessary to provide the three ultrasonic receivers and a receiving circuit for detecting a propagation time of respective reception waves, thereby causing to increase cost.

The inventors studied hard, and it has become clear that a demand for inputting coordinates from various input planes is not so high, and that if it is possible to input coordinates from the input planes determined to a certain degree such as an already provided black board, an already provided desk, a display screen of a computer, or the like, the demand can sufficiently be satisfied.

SUMMARY OF THE INVENTION

It is therefore the object of the present invention to provide a coordinate input apparatus which is able to input coordinates from a plurality of input planes only by two ultrasonic receivers.

In order to attain the above object, according to an aspect of the present invention there is provided a coordinate input apparatus capable of making a coordinate input from a plurality of input planes, comprising an input device having an ultrasonic transmitter; two ultrasonic receivers which are aligned in a direction not perpendicular to the plurality of input planes and receives ultrasonic waves transmitted from the ultrasonic transmitter; a synchronizing means for synchronizing the input device with the ultrasonic receiver; an input plane setting part for setting a positional relation between the two ultrasonic receivers and the plurality of input planes; and an input coordinate generator which generates each distance from the input device to the two ultrasonic receivers in accordance with a propagation time interval from the input device to the two ultrasonic receivers of an ultrasonic signal to be received by the two ultrasonic receivers, and generates input coordinates in a plurality of the set input planes in accordance with the corresponding two distances.

According to the present invention, the two ultrasonic receivers are provided in common for the plurality of input planes, and further the plurality of input planes are restricted to a plane not perpendicular to a line connecting the two ultrasonic receivers, so that the sufficiently practicable coordinate input device can be provided. This is because when the line connecting the two ultrasonic receivers is perpendicular to the input plane, the distances from the input device in the input plane to the two ultrasonic receivers exist in a plurality of sets, so that the coordinates of an input device cannot be specified.

Furthermore, according to the present invention, in order to acquire the coordinates of the input device in the input plane by the two ultrasonic receivers, a positional relations between the two ultrasonic receivers and the plurality of input planes are made initial setting in advance. When this positional relations have been in advance set, it is possible to acquire the position of the input devices in the plurality of input planes from the distance from the input device to the two ultrasonic receivers.

According to the preferred embodiment, such the setting is made as the initial value setting prior to using the coordinate input device, and the initial value is recorded as a set value in a memory of the computer. For example, a three-dimensional coordinate in which the input plane is set as a two-dimensional coordinate plane and a direction perpendicular to the input plane is set as a third axis of coordinates is established, and coordinate values of the two ultrasonic receivers in such a three-dimensional coordinate system are made initial setting in each input plane. The coordinate values of the two ultrasonic receivers in the three-dimensional coordinate system of the respective input planes are established, so that the coordinate value of the input device in the input plane can be acquired from the distances between the input device and the two ultrasonic receivers.

According to the preferred embodiment, positions of the plurality of input planes are set so that the distances of the two ultrasonic receivers and the input planes differ among the plurality of input planes. A range of the respective input plane is initially set in each three-dimensional coordinate system, and then it is checked whether or not the coordinate value of the input device is in the range of the input planes which were initially set, so that it is possible to detect from which input plane the coordinate input is to be made.

In order to attain the above object, according to another aspect of the present invention there is provided a coordinate input apparatus capable of making a coordinate input from a plurality of input planes, comprising an input device having an ultrasonic transmitter (receiver); two ultrasonic receivers (transmitters) which are aligned in a direction not perpendicular to the plurality of input planes and receive (transmit) ultrasonic waves from (to) the ultrasonic transmitter (receiver); a synchronizing means for synchronizing the input device with the ultrasonic receivers (transmitters); an input plane setting part for setting a positional relation between the two ultrasonic receivers (transmitters) and the plurality of input planes; and an input coordinate generator which generates each distance from the input device to the two ultrasonic receivers (transmitters) in accordance with propagation time intervals from the input device to the two ultrasonic receivers (transmitters) of an ultrasonic signal to be received by the ultrasonic receivers, and generates input coordinates in a plurality of the set input planes in accordance with the corresponding two distances.

In a more preferred embodiment of the above invention, the input plane setting part sets coordinate values of the two ultrasonic receivers (transmitters) with respect to each of the plurality of input planes, in a three-dimensional coordinate system when a two-dimensional coordinate (X, Y) is taken on the input plane and a third coordinate axis (Z) is taken in a direction perpendicular to the corresponding input plane, and the input coordinate generator generates coordinate values of the input device in the three-dimensional coordinate system in accordance with the two distances.

BRIEF DESCRIPTION OF THE DRAWINGS

FIG. 19 is a representation for explaining detection of a position of the input pen in FIG. 15;

FIG. 26 is a representation showing infrared rays synchronous signals and ultrasonic received waves detected by the receiving unit R;

FIG. 27 is a diagram showing another configurational example of the input pen;

FIG. 29 is a cross-sectional view showing still another configurational example of the input pen;

FIG. 30 is a cross-sectional view showing still another configurational example of the input pen;

FIG. 31 is a cross-sectional view showing still another configurational example of the input pen;

FIG. 32 is a three-directional view showing the receiving unit capable of freely fixing to the plurality of input planes;

DESCRIPTION OF THE PREFERRED EMBODIMENTS

Preferred embodiments of the present invention will now be described with reference to the accompanying drawings. However, such embodiments are not intended to limit the technical scope of the present invention.

Figure 1:
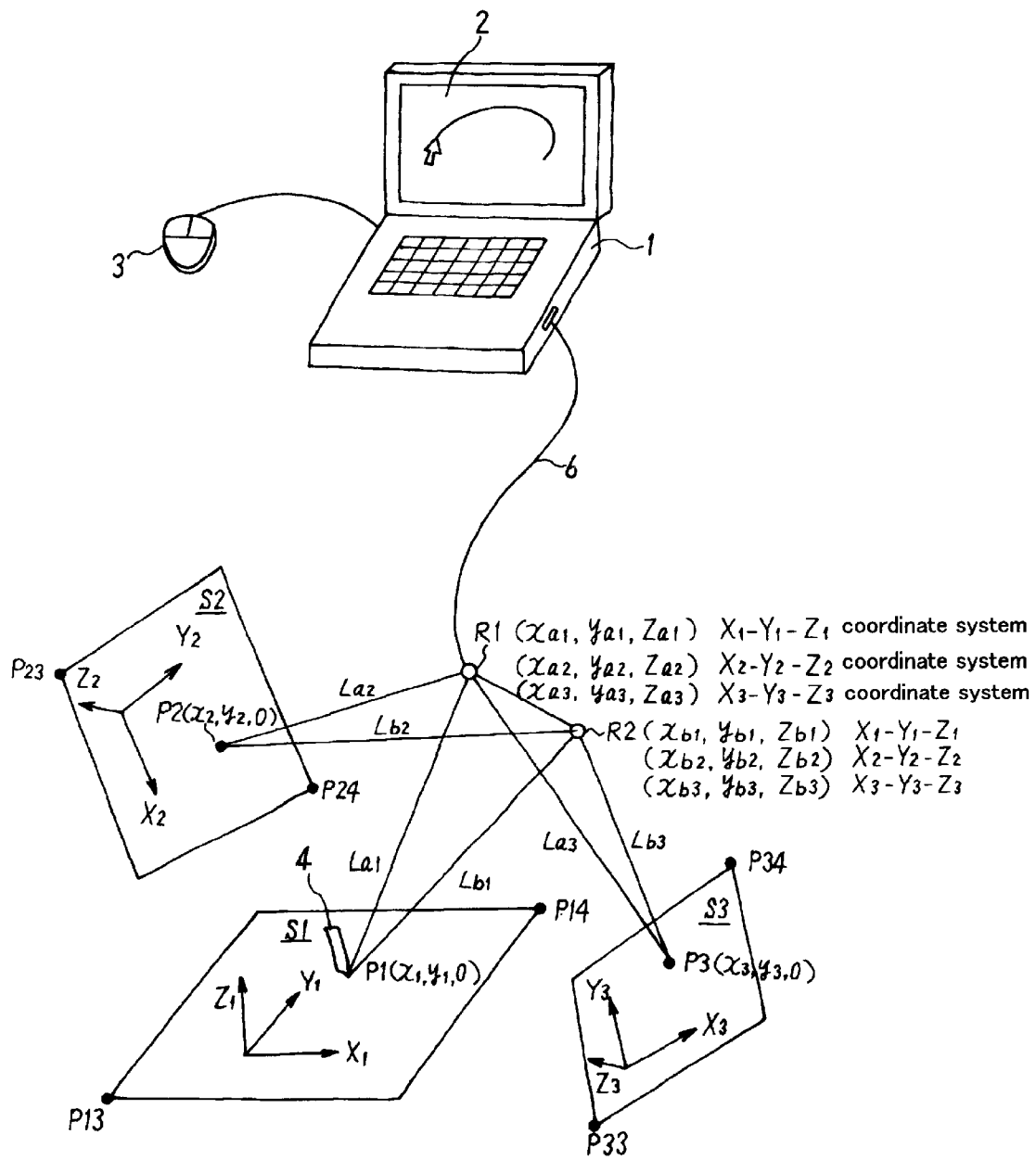
FIG. 1 is a representation showing a relation between two ultrasonic receivers and a plurality of input planes according to an embodiment of the present invention.

FIG. 1 is a representation showing a relation between two ultrasonic receivers and a plurality of input planes according to an embodiment of the present invention. FIG. 1 shows a note-type personal computer 1 having a display screen 2 and a mouse 3 connected thereto. When an input device 4 is moved on a plurality of input planes S1, S2, S3 relative to this computer 1, a coordinate in each input plane is input to the computer 1, and it is possible to input a desirable position on the display screen 2 of the computer and display a locus of the input locus 4.

The coordinate input device according to this embodiment has the input device 4 having an ultrasonic transmitter and two ultrasonic receivers R1, R2 which are positioned at predetermined positions and receive ultrasonic waves transmitted from the ultrasonic transmitter. The input device 4 has an ultrasonic transmitter, and for example, a pen-type input device to be described later is preferable.

Furthermore, in order to specify a timing that an ultrasonic signal is transmitted, a synchronizing means is provided. For example, infrared rays are transmitted from the input device 4, and its synchronous timing is detected by a light receiving element (not shown) provided in the vicinity of the receivers R1, R2.

The ultrasonic signal transmitted from the input device 4 is received by the receivers R1, R3, and distances La, Lb from the input device 4 to the respective receivers R1, R2 are acquired according to time differences relative to the synchronizing means. A position in the input plane of the input device 4 is detected from these distances La, Lb.

According to this embodiment, by utilizing only two ultrasonic receivers, it is possible to input coordinates from the plurality of input planes arranged in a three-dimensional space. In order to detect the position of the input device in the three-dimensional space, three ultrasonic receivers are necessary in principle. According to this embodiment, in order to reduce cost, a certain limitation is given to the positions of the input planes, and then this allows to detect the position in the plurality of input planes by the two ultrasonic receivers.

As such the certain limitation, a line connecting the two ultrasonic receivers is not made perpendicular to the input planes. It is preferable that the both have a relation of being away from 90 degrees as much as possible. This is because when the line connecting the two ultrasonic receivers is perpendicular to the input plane, the position in the input plane is not specified uniquely from combination of distances between the input device in the input plane and the two ultrasonic receivers. Furthermore, the certain limitation is that a positional relation between the plurality of input planes and the two ultrasonic receivers has been in advance set. For example, coordinate values of the two ultrasonic receivers in a three-dimensional coordinate system set on the input plane are initially set. Alternatively, according to another example, a length of a perpendicular line lowered on the input plane from the ultrasonic receiver has been in advance set. Alternatively, the position of the input plane in the coordinate system with the ultrasonic receiver as the origin is initially set. By this initial setting value, in the coordinates of the input device in the input plane, the unknown becomes two, and it becomes possible to detect the coordinate value even by the two ultrasonic receivers.

The initial setting of a positional relation between a plurality of input planes S1, S2, S3 and two ultrasonic receivers R1, R2 will be explained. In a method for setting the positional relation between the both, there are various methods, (1) the three-dimensional coordinate system with the input plane as its two-dimensional coordinate plane with respect to each input plane is set, and coordinate values of the ultrasonic receivers R1, R2 in the three-dimensional coordinate system are set; and (2) the three-dimensional coordinate system is set with respect to the ultrasonic receivers R1, R2, and the coordinate values of the plurality of input planes, inclinations, or the like in the three-dimensional coordinate system are set. It is also possible that arbitrary three-dimensional coordinate system is set, and the positions of the ultrasonic receivers and the input planes therein may be set.

According to this embodiment, the positional relation is set by the aforementioned method (1). First, X1 axis and Y1 axis are set on the input plane S1 and Z1 axis is set in a direction perpendicular to the input plane S1, with respect to the input plane S1. Coordinate values of the ultrasonic receivers R1, R2 in this three-dimensional coordinate system X1-Y1-Z1 are made the initial setting.

Figure 2:
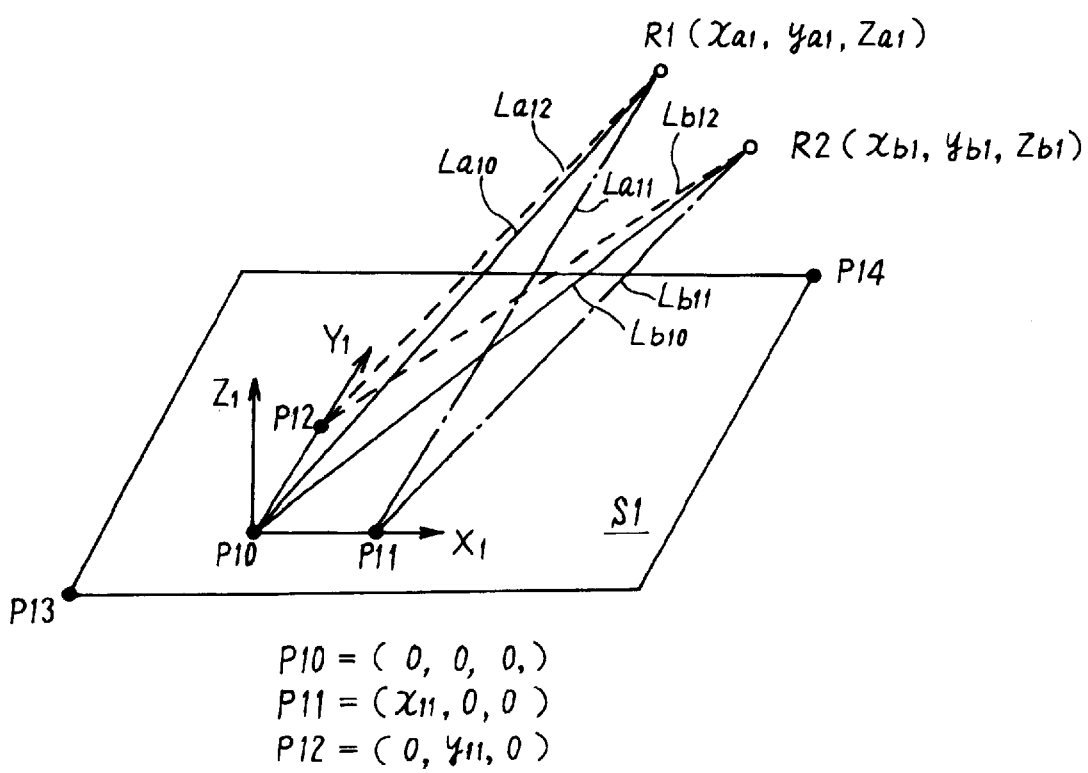
FIG. 2 is an illustration for explaining a method for setting the input planes.

FIG. 2 is an illustration for explaining a method for setting the positional relation between the input plane and the ultrasonic receivers. As mentioned above, the three-dimensional coordinate system X1-Y1-Z1 is set with respect to the input plane S1. This is carried out by an operator's entering coordinate axes of X1 and Y1 in the input plane, for example. Ultrasonic waves are transmitted by the input device from the known 3 points in the two-dimensional coordinate of X1 and Y1, for example, the origin P10(0, 0, 0), point P11(x11, 0, 0) on X1 axis and point P12(0, y11, 0) on Y1 axis, and as shown in the figure, distances La10, Lb10, La11, Lb11, La12, Lb12 of the respective points P10, P11, P12 and the ultrasonic receivers R1, R2 are acquired.

Then, when the unknown coordinate values of the ultrasonic receivers R1, R2 are set as R1(xa1, ya1, za1), R2(xb1, yb1, zb1), with respect to the distances La10, Lb10 between the point P10 and the receivers R1, R2, $$xa1^2+ya1^2+za1^2=La10^2 \qquad (1)$$

$$xb1^2+yb1^2+zb1^2=Lb10^2 \qquad (2),$$

with respect to the distances La11, Lb11 between the point P11 and the receivers R1, R2, $$(x11-xa1)^2+ya1^2+za1^2=La11^2 \qquad (3)$$

$$(x11-xb1)^2+yb1^2+zb1^2=Lb11^2 \qquad (4),$$

with respect to the distances La12, Lb12 between the point P12 and the receivers R1, R2, $$xa1^2+(y11-ya1)^2+za1^2=La12^2 \qquad (5)$$

$$xb1^2+(y11-yb1)^2+zb1^2=Lb12^2 \qquad (6), and$$

the unknown of 6 pieces, R1(xa1, ya1, za1), R2(xb1, yb1, zb1), can be solved by 6 simultaneous equations (1) to (6).

The relation between the input planes S2, S3 of FIG. 1 and the ultrasonic receivers R1, R2 also can be acquired in the same manner. The coordinate values of the ultrasonic receivers with respect to each input plane are set as an initial value, and is stored by a coordinate input control part, described later.

Returning to FIG. 1, in a state that the coordinate values of the ultrasonic receivers in the coordinate system of each input plane:

R1(xa1, ya1, za1), R2(xb1, yb1, zb1),

R1(xa2, ya2, za2), R2(xb2, yb2, zb2),

R1(xa3, ya3, za3), R2(xb3, yb3, zb3), are made the initial setting, when the input device transmits ultrasonic waves from arbitrary position P1(x1, y1, 0) on the input plane S1 to make coordinate input, distances La1, Lb1 to the two ultrasonic receivers R1, R2 are detected, respectively. As a result, the following equation is established.

$$(x1-xa1)^2+(y1-ya1)^2+za1^2=La1^2 \qquad (7)$$

$$(x1-xb1)^2+(y1-yb1)^2+zb1^2=Lb1^2 \qquad (8)$$

By solving these simultaneous equations, the input coordinate value P1 (x1, y1, 0) is acquired. It is possible to acquire the input coordinates on the input planes S2, S3, in the same manner.

According to this embodiment, in order to detect the input coordinate automatically from no matter which input planes the coordinate values are input, the position of each input plane is limited so that the distances between the input planes and the ultrasonic receivers are not overlapped each other. Namely, at a stage of the initial setting, the region ranges of the input planes are set by the input device, respectively.

As shown in FIG. 2, in the initial setting, the coordinate input is carried out by the input device from the input point P13 which is minimized in X, Y coordinates and the input point P14 which is maximized therein. As mentioned above, the coordinate value (x13, y13, 0) of the point P13 is acquired by ultrasonic transmission from the point P13, and in the same manner, the coordinate value (x14, y14, 0) of the point P14 is acquired by ultrasonic transmission from the point P14. These 2 coordinate values are subjected to the initial setting, whereby when acquiring the input coordinate value (x1, y1, 0) on the input plane S1 and satisfying the following relation, it is possible to judge that the coordinate input is made from the input plane S1.

$$x13 < x1 < x14 \quad (9)$$

$$y13 < y1 < y14 \quad (10)$$

In order to utilize the aforementioned judging method, the position of each input plane is limited to the range that the distances of the input planes and the ultrasonic receivers are not overlapped each other. In other words, regions S2', S3', which are projected on the two-dimensional coordinate plane of X1-Y1 of the input plane S1 by rotating the input planes S2, S3 around the line connecting the 2 ultrasonic receivers R1, R2, are limited so as not to overlap with the region of the input plane S1.

By so doing, when the coordinate input is carried out from arbitrary input plane, in the case where the relation between (9) and (10) is satisfied, it is possible to judge that the coordinate input is carried out from the input plane S1. When the projected regions S2', S3' are overlapped with the region of the input plane S1, even in the case of satisfying (9) and (10) above, there is a possibility that the input was made from the input planes S2, S3. Accordingly, at a stage of the initial setting, when the coordinate inputs of the minimum and maximum of the coordinate values of each input plane are made, the overlapping of the region is judged, and it is preferable that in the case of being overlapped, any warning is output. Incidentally, even when an input range is not rectangular, it may be considered as a rectangular set. However, if information from which input plane the input was made is provided to the coordinate input device whenever the coordinate inputs may be made from the input device, it is not necessary to prohibit the overlapping of the aforementioned regions.

Summarizing the initial setting according to this embodiment from above, the two ultrasonic receivers are located in predetermined positions, and the plurality of input planes are located in directions not perpendicular to the lines connecting therewith. And, an operator transmits ultrasonic waves by the input device from the known three points from the respective input planes, and acquires each of the coordinate values of the two ultrasonic receivers in the three-dimensional coordinate system of the input plane, and makes the initial setting. Next, the operator carries on the coordinate inputs of the minimum and maximum of coordinates in each input plane, and makes the initial setting of the region of the input plane. At this time, a warning is output so as not to overlap the regions, appropriately, and the operator responds the warning to change the position of the input plane. After the end of the initial setting, the operator carries on the coordinate input on each input plane. The coordinate input device acquires the two-dimensional coordinate of the input plane from the distance of the input device and two ultrasonic receivers. And, it is checked whether or not the acquired two-dimensional coordinate value is in the range of the region of the input plane which was made the initial setting, and it is automatically judged from which input plane the input was made.

Figure 3:
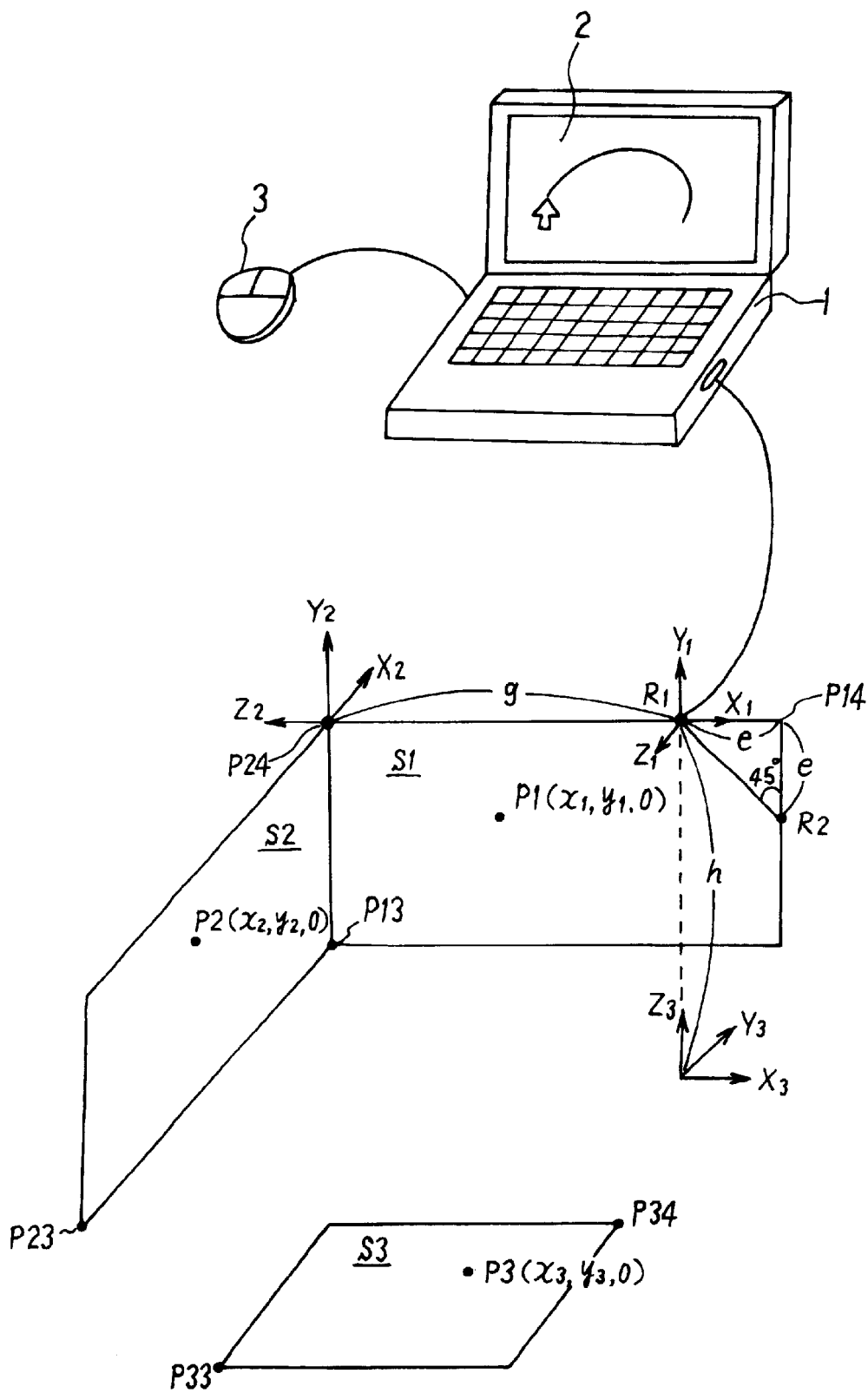
FIG. 3 is a representation showing a relation between the two ultrasonic receivers and the plurality of input planes according to the embodiment of the present invention.

FIG. 3 is a representation showing an example of the input plane more simplified according to this embodiment. In this example, the input planes S1, S2 are located on two walls (vertical planes) in a room and the input plane S3 is arranged on one desk (horizontal plane). As in the two ultrasonic receivers R1, R2, the line connecting therebetween is prohibited from being perpendicular to any one of the input planes S1, S2, S3, in the example of FIG. 3, the receivers R1, R2 are located so as to align on a first input plane S1 and at an angle of 45 degrees with respect to a perpendicular line. The more an angle made between the line connecting the receivers and the input plane is away from 90 degrees, with the higher precision the position in the input plane can be detected.

Furthermore, for clarity of understanding, the three-dimensional coordinates X1, Y1, Z1 of the input plane S1 are set so that the receiver R1 is the origin and the input plane S1 is X1 or Y1 axis, and the three-dimensional coordinates X2, Y2, Z2 of the input plane S2 are set so that a point (P24) in which a perpendicular line is lowered from the receiver R1 to the input plane S2 is the origin, and the input plane S2 is X2 or Y2 axis, and further the three-dimensional coordinates X3, Y3, Z3 of the input plane S3 are set so that a point in which a perpendicular line is lowered from the receiver R1 to the input plane S3 is the origin, and the input plane S2 is X3 or Y3 axis. Each Z axis is perpendicular to the input plane.

In this manner, when the three-dimensional coordinate axis of each input plane is set, the coordinate values of the receivers R1, R2 in the three-dimensional coordinates X1, Y1, Z1 of the input plane S1 are:

$$R1(0, 0, 0), R2(e, -e, 0).$$

Furthermore, when a length of a perpendicular line from the receiver R1 to a second input plane S2 is g, the coordinate values of the receivers R1, R2 in the three-dimensional coordinates X2, Y2, Z2 of the input plane S2 are:

$$R1(0, 0, -g), R2(0, -e, -g-e).$$

Furthermore, when a length of a perpendicular line from the receiver R1 to a third input plane S3 is h, the coordinate values of the receivers R1, R2 in the three-dimensional coordinates X3, Y3, Z3 of the input plane S3 are:

$$R1(0, 0, h), R2(e, 0, h-e).$$

The coordinate values of the receivers showing these positional relations are recorded as initial values.

The aforementioned coordinate values of the receivers are acquired by transmitting ultrasonic waves from the known three points in each input plane, as explained in FIG. 2. Alternatively, when lengths e, g, h have been previously found, it is possible to directly input the coordinate values.

When distances to the two ultrasonic receivers R1, R2 are La1, Lb1, in the same manner as in the equations (7), (8) above, the input coordinate P1(x1, y1, 0) in the first input plane S1 is:

$$x1^2+y1^2=La1^2$$

$$(x1-e)^2+(y1+e)^2=Lb1^2, \text{ and}$$

the input coordinate P1(x1, y, 0) is acquired by solving this simultaneous equation.

Similarly, when distances to the two ultrasonic receivers R1, R2 are La2, Lb2, in the same manner as in the equations (7), (8) above, the input coordinate P2(x2, y2, 0) in the second input plane S2 is:

$$X2^2+y2^2+g^2=La2^2$$

$$x2^2+(y2+e)^2+(g+e)^2=Lb2^2, \text{ and}$$

the input coordinate P2(x2, y, 0) is acquired by solving this simultaneous equation.

Similarly, when distances to the two ultrasonic receivers R1, R2 are La3, Lb3, in the same manner as in the equations (7), (8) above, the input coordinate P3(x3, y3, 0) in the third input plane S3 is:

$$x3^2+y3^2+h^2=La3^2$$

$$(x3-e)^2+y3^2+(h-e)^2=Lb3^2, \text{ and}$$

the input coordinate P3(x3, y3, 0) is acquired by solving this simultaneous equation.

Even in the case of the example of FIG. 3, each input plane is located so that the region of the input plane S1 and the region of planes S2', S3' (not shown) projected on the input plane S1 by rotating the input planes S2, S3 around a straight line R1-R2 are not overlapped each other, whereby it can be automatically recognized from which input plane the coordinate was input.

Figure 4B:
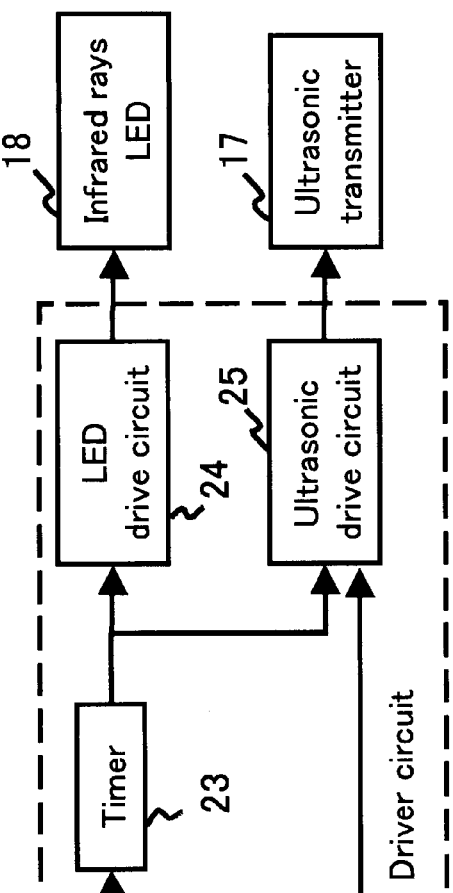
FIG. 4 is a diagram showing a configurational example of an input device.
Figure 4A:
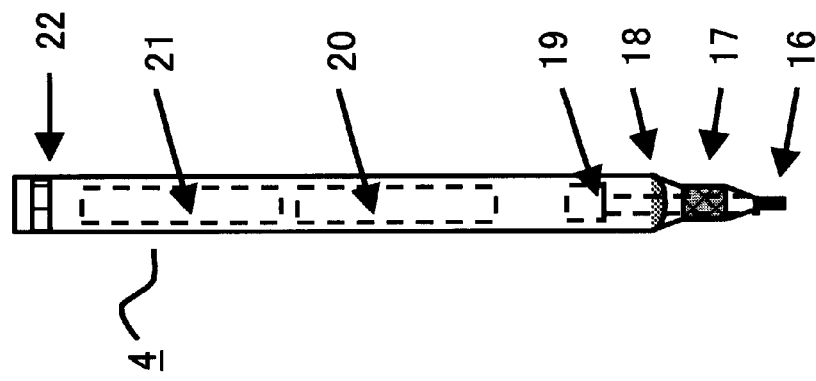

FIG. 4 is a diagram showing a configurational example of the input device 4. The input device shown in FIG. 4A is an input device of pen configuration. A ball-point pen core 16 which can get in and out is provided at a pen front end within a pen, and a pressure-sensitive switch 19 for detecting contact of the ball-point pen core 16 with a write-down face when writing. Furthermore, a cylindrical ultrasonic transmitter 17 and an infrared rays LED 18 are provided at a front end of the pen. The cylindrical ultrasonic transmitter 17 is composed of a cylindrical piezoelectric film made of polyvinylidene fluoride, for example, and as cylindrical, it is possible to have directivity of 360 degrees, and to transmit ultrasonic waves similarly in all directions even if the pen rotates to reach them at the ultrasonic receiver. The two infrared rays LEDS 18 having directivity of 180 degrees are disposed diagonally, and also even if the pen rotates, the infrared rays similarly reach a photo-detector PD (not shown) provided in the vicinity of the receivers. Furthermore, a drive circuit 20, a charging battery 21, an electrode 22 which comes into contact with a holder side electrode to charge a charging battery when being in a holder (not shown) of the computer, and an electrode 22 for receiving a signal transmitted from the computer, which instructs a generation of ultrasonic waves when in the holder, are attached. The holder will be described later.

FIG. 4B shows an internal block diagram of the input device of pen type. A contact detection switch 19 detects a contact of the ball-point pen core 16 with a write-down face, or a contact of a pen point with the write-down face when the core is inside as mentioned later. When such a contact is detected by the contact detection switch 19, a LED drive circuit 24 and an ultrasonic drive circuit 25 are activated respectively in a fixed period generated by a timer 23, and the infrared rays are transmitted from the infrared rays LED 18 and ultrasonic pulses from the ultrasonic transmitter 17, respectively. This transmission period is a time to such a degree that movement of the pen by an operator's hand can be detected stably, and is set to frequency of about 100 Hz, for example. Furthermore, as mentioned below, it is possible to generate also the ultrasonic pulses by a signal from a computer side by way of a holder contact electrode 22.

A synchronizing means for transmitting ultrasonic waves is configured by the aforementioned infrared rays LED 18 and an infrared rays receiver PD provided in the vicinity of the ultrasonic receivers. A time difference between when receiving the infrared rays and when receiving the ultrasonic waves corresponds to an ultrasonic propagation time between the input device of pen type and the ultrasonic wave receivers.

Figure 5B:
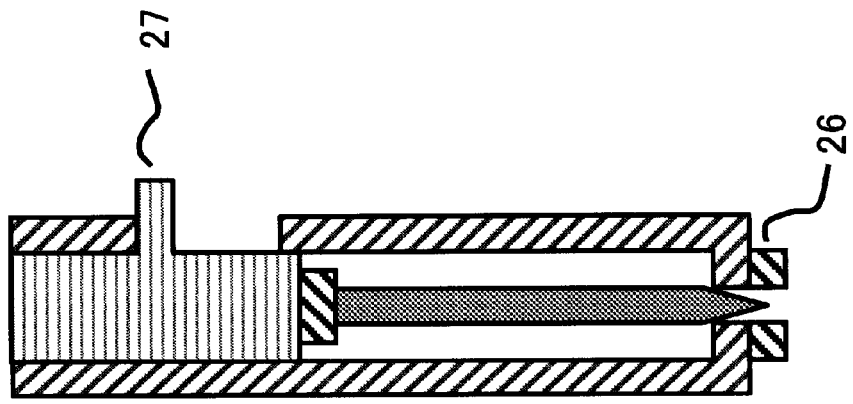
FIG. 5 is a view showing a mechanism in which a ball-point pen core of a pen type of input device gets in and out.
Figure 5A:
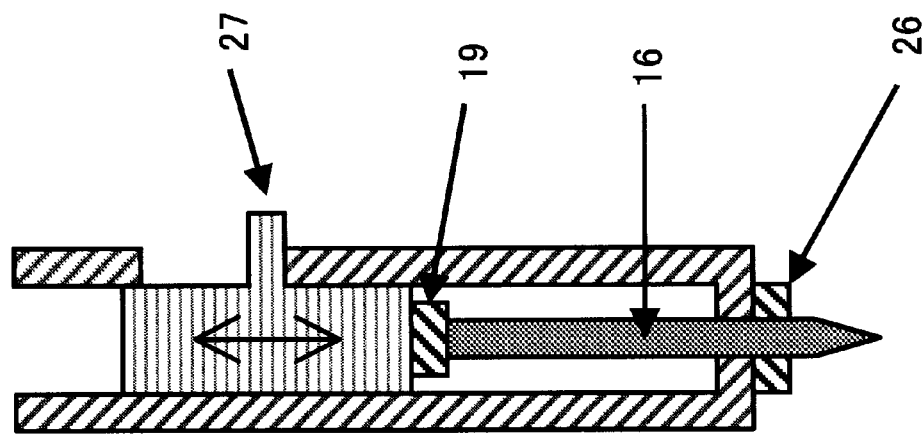

FIG. 5 is a view showing a mechanism in which the ball-point pen core of the pen type input device gets in and out. By sliding a switching lever 27 provided besides the pen, the ball-point pen core 16 can get into and out of the pen point. The contact detection switches 19, 26 are attached to the root of the ball-point pen core 16 and pen point. In a state FIG. 5A that the core 16 gets out, a contact of the core with the write-down face is detected by the switch 19 at the root of the core. In a state FIG. 5B that the core gets in, a contact of the pen point with the write-down face is detected by the switch 26. In the input plane where a drawing can actually be drawn by the ball-point pen core, the ball-point pen core projects to a front end part, and in the input plane where it cannot be drawn, as its plane is stained, the core gets in for using.

Figure 6:
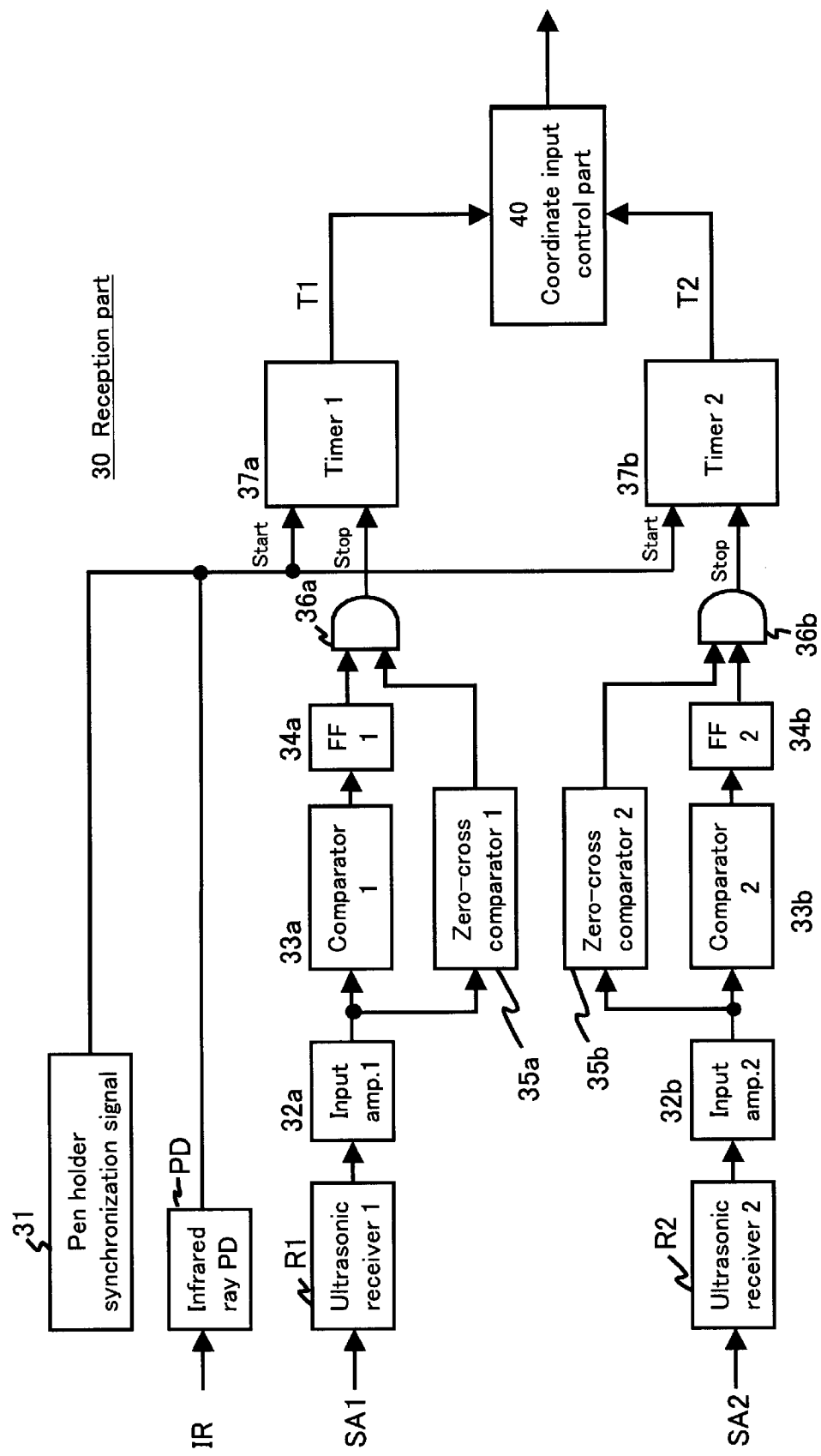
FIG. 6 is a block diagram of an ultrasonic reception part.
Figure 7:
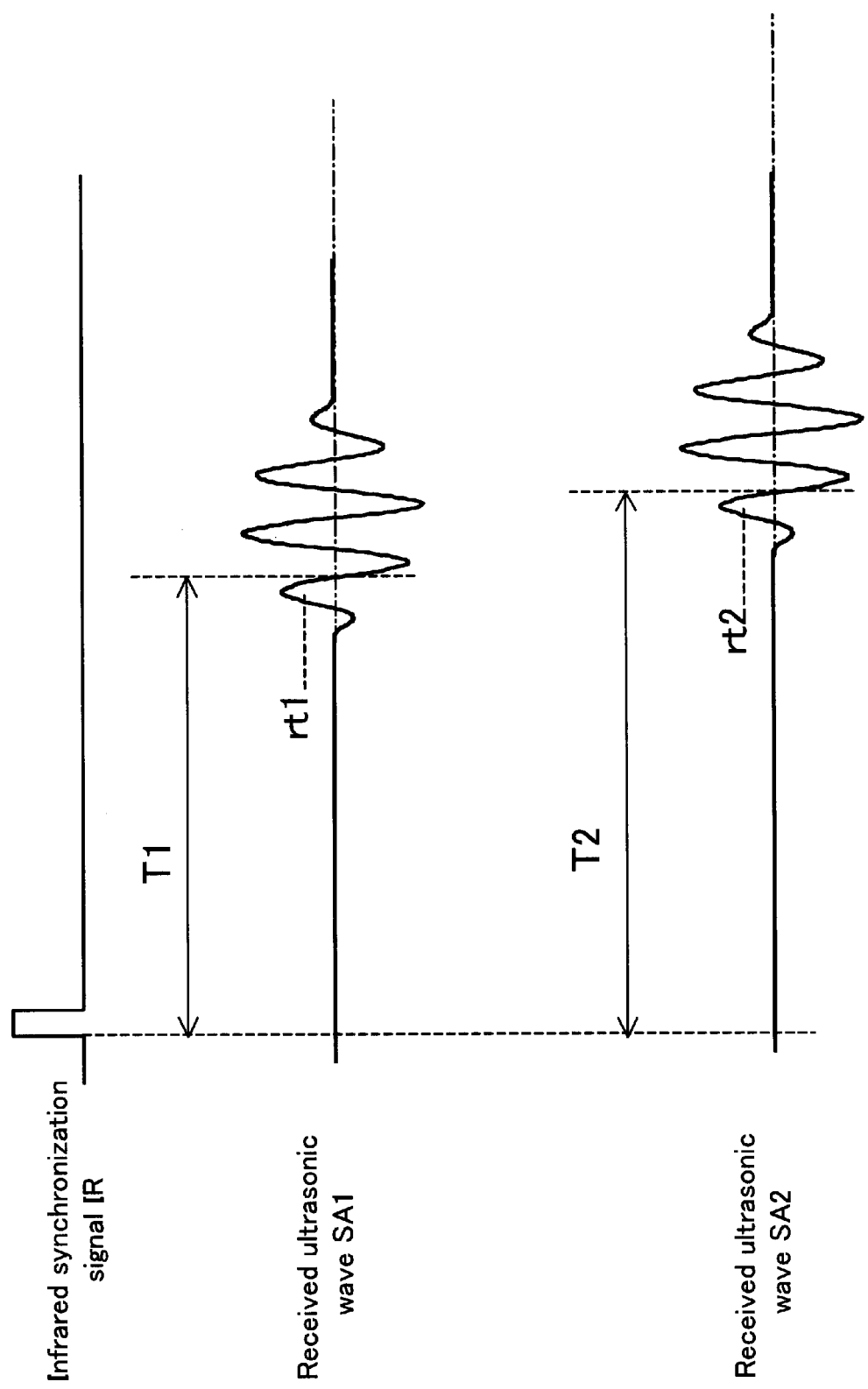
FIG. 7 is a timing chart in the ultrasonic reception part.

FIG. 6 is a block diagram of the ultrasonic reception part which is implemented in the computer, or is disposed integrally with the ultrasonic receivers R1, R2. Furthermore, FIG. 7 is a timing chart in the ultrasonic reception part. The ultrasonic receivers R1, R2 detect ultrasonic pulses SA1, SA2 from the pen type input device, and the infrared rays light receiving element PD detects an infrared rays pulse IR, respectively. After the ultrasonic pulses SA1, SA2 from the pen type input device are detected by the ultrasonic receivers R1, R2, they are amplified by an input amplifier 32.

The received ultrasonic reception waves become a waveform shown in FIG. 7. Then, it is detected by a comparator 33 whether or not the waveform is greater than a suitable threshold rt1, and a flip-flop 34 is turned on at a timing that the received waves exceed the threshold rt1. Furthermore, a zero-cross of the received waves is detected by a zero-cross comparator 35, and a next zero-cross position after the received waves exceed the threshold rt1 is detected depending on a logic product 36 of outputs of the flip-flop 34 and the zero-cross comparator 35. This time becomes an arrival time of the ultrasonic pulses. Then, an ultrasonic propagation time interval T1 from a reception time of an infrared rays synchronous signal IR to arrival of the ultrasonic pulse is detected by a timer 37. In the receiver R2, a propagation time interval T2 is detected, similarly.

These propagation time intervals T1, T2 are supplied to a coordinate input control part 40 described later. Then, the coordinate input control part 40 acquires the input coordinates from the ultrasonic propagation time intervals T1, T2.

Figure 8:
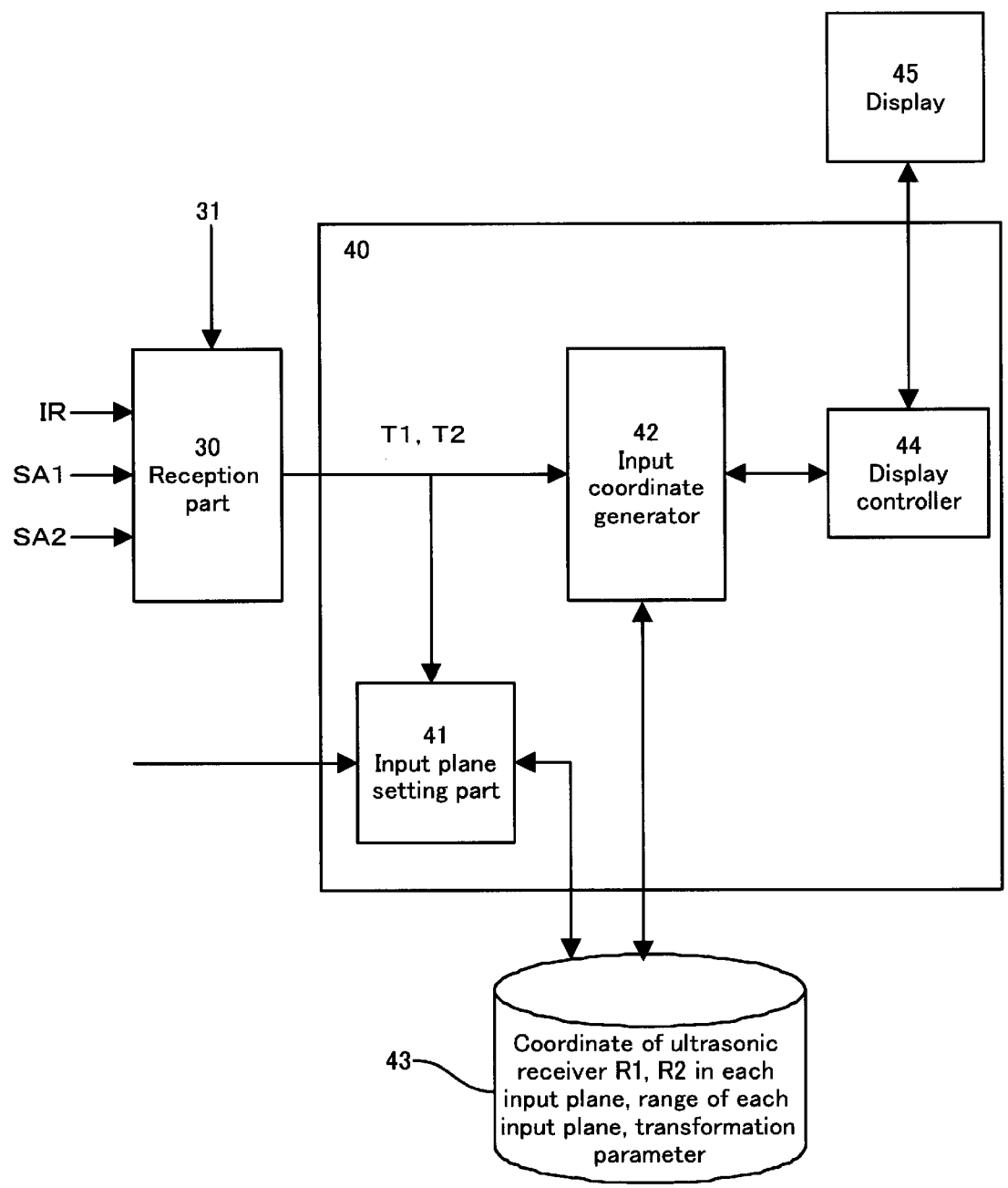
FIG. 8 is a configurational view of a coordinate input control part.

FIG. 8 is a configurational view of the coordinate input controller 40. The coordinate input controller 40 has an input coordinate generator 42 for generating the input coordinates on the input plane from the ultrasonic propagation time intervals T1, T2 generated by the reception part 30; a display controller 44 to which the input coordinates generated by the input coordinate generator 42 are supplied; and an input plane setting part 41 to which the initial setting value is input at the time of the initial setting of the input planes to record.

Figure 9:
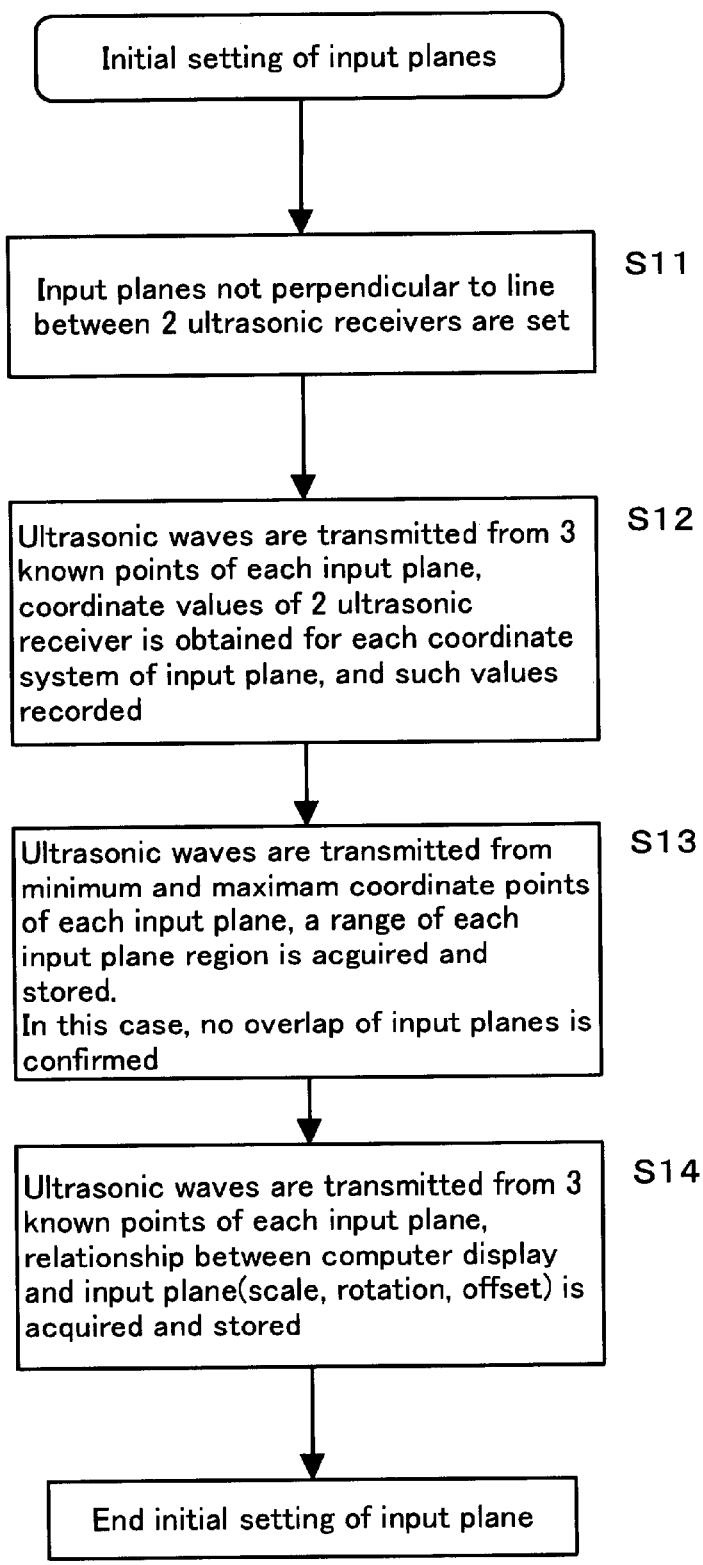
FIG. 9 is a flow chart of initial setting of the input plane.
Figure 10:
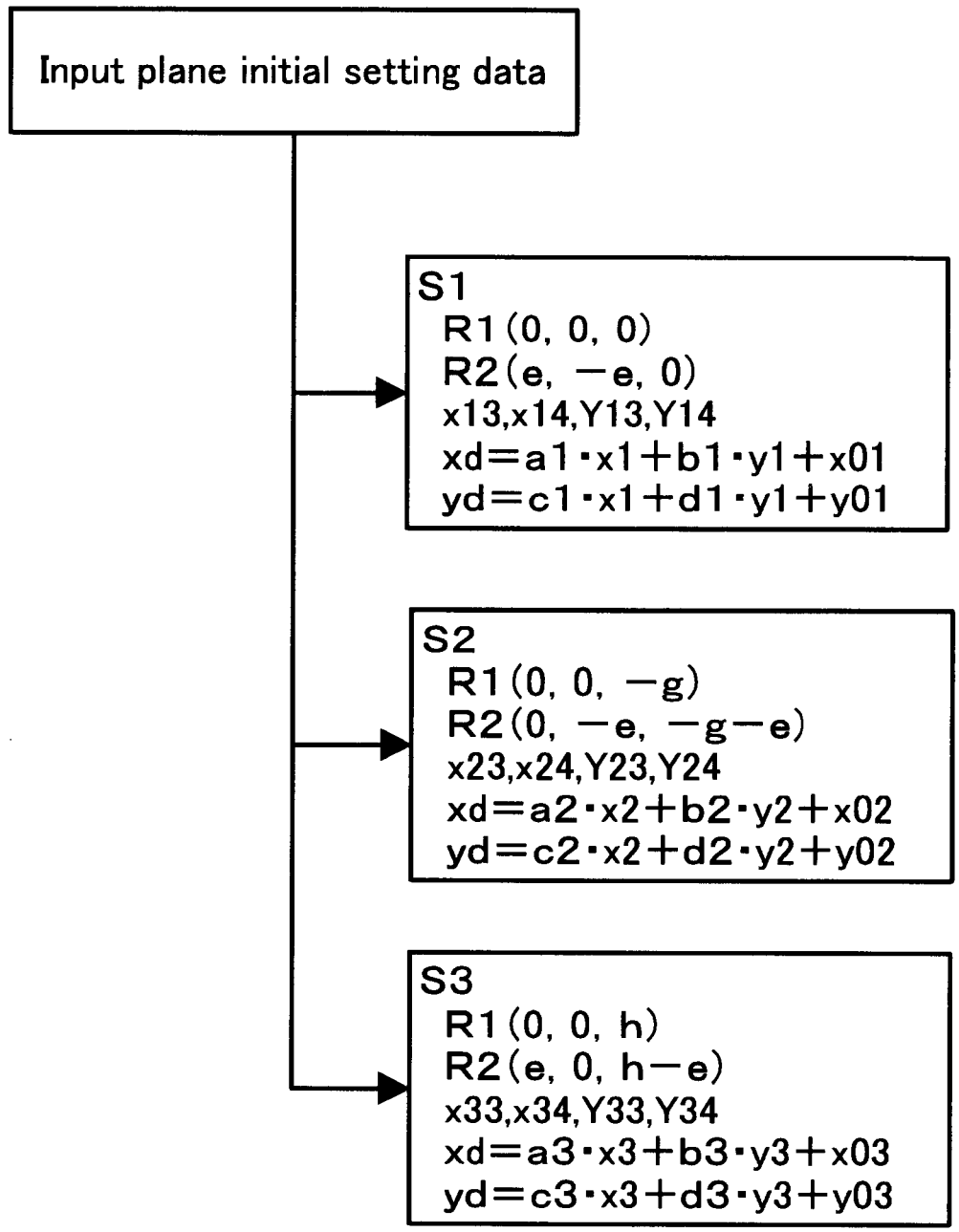
FIG. 10 is a representation showing an example of input plane setting data.

Returning to FIG. 3, the initial setting of the coordinate input device will be explained again. FIG. 9 is a flow chart of the initial setting of the input plane, and FIG. 10 is a representation showing an example of input plane setting data set thereby.

Initially, the ultrasonic receivers R1, R2 are located at a position where the line connecting with the two receivers is not perpendicular to the planes S1, S2, S3 to be utilized as the input plane. In the example shown in FIG. 3, they are located on a wall (the same plane) provided with the input plane S1 in a state that the line connecting the both is inclined at 45 degrees with respect to a horizontal line (S11). Furthermore, a three-dimensional coordinate system having X-Y coordinate on the input plane and Z axis perpendicular to the input plane in each input plane is set. And, when the ultrasonic waves SA are transmitted by the input device from the known 3 points in the input plane, the reception part 30 acquires respective propagation time intervals T1, T2, and the input plane setting part 41 acquires coordinate values of the ultrasonic receivers R1, R2 in the three-dimensional coordinate system of each input plane as mentioned above, and stores them in a memory 43 (S12). The known 3 points are designed to have been in advance set as the origin and predetermined points on X and Y axes, for example.

In the example of FIG. 3, R1(0, 0, 0) and R2(e, -e, 0) are set to the coordinate system X1-Y1-Z1 of the input plane S1, R1(0, 0, -g) and R2(0, -e, -g-e) are set to the coordinate system X2-Y2-Z2 of the second input plane S2, and R1(0, 0, h) and R2(e, 0, h-e) are set to the coordinate system X3-Y3-Z3 of the third input plane S3.

Next, when the ultrasonic waves are transmitted by the input device from a minimum and maximum of the coordinate in each input plane, the input coordinate generator 42 acquires coordinate values of both points, and the acquired coordinate values are stored in the memory 43 as a range of each input plane (S13).

In the first input plane S1, coordinate values of point P13(x13, y13) and point P14(x14, y14) are stored, and in the second input plane S2, coordinate values of point P23(x23, y23) and point P24(x24, y24) are stored, and in the third input plane S3, point P33(x33, y33) and point P34(x34, y34) are stored. These points may be input from a keyboard when known.

In this case, as mentioned above, it is confirmed that the regions of the input plane are not overlapped each other from a relation of a distance relative to the two ultrasonic receivers. When the overlapping is detected, the operator will be informed of movement of the input plane.

At a last stage of the initial setting, a transformation parameter of each input plane and a display screen of the computer 1 is set (S14). It is expected that a rotation component, an offset component and a scale component differ between the input plane and the display screen 2 of the computer. Accordingly, by acquiring in advance their parameters, the coordinate value of the input plane can be transformed to the coordinate value in the display screen 2 of the computer.

In order to acquire this transformation parameter, for example, it is taken the correspondence between the known 3 points of the input plane and the known 3 points of the display screen of the computer. For example, the position of the input coordinate is moved to the known 3 points in the display screen 2 of the computer, and the coordinate input is made at respective positions. The two-dimensional coordinate value in each input plane is acquired by ultrasonic transmission from the input device. A transformation from coordinate (x1, y1) on the input plane to coordinate value (xd, yd) in the display screen 2 is acquired from the relation of the coordinate values of both planes as follows:

$$xd = a1 \cdot x1 + b1 \cdot y1 + x01$$

$$yd = c1 \cdot x1 + d1 \cdot y1 + y02$$

In this case, a1, b1, c1, d1 are a rotation parameter and a scale parameter between both the coordinate systems, and x01, y01 are an offset parameter. These parameters are stored in each input plane as initial values. Incidentally, if utilizing the known 3 points used at step S12, it would be simpler because of additional transmitting the ultrasonic waves.

In this manner, as shown in FIG. 10, the initial value is set in each input plane by the input plane setting part 41 and stored.

After that, when the coordinate input is made by the input device 4 from each input plane, the reception part 30 acquires the ultrasonic propagation time intervals T1, T2 from infrared rays synchronous signals and ultrasonic waves from the input device 4, and the input coordinate generator 42 calculates the two-dimensional coordinate on each input plane from the propagation time intervals T1, T2, and compares the coordinate value of each input plane with a range of each input plane to detect from which input plane the coordinate input is made. And, the two-dimensional coordinate on the input plane is transformed to the two-dimensional coordinate in the display screen of the computer by the aforementioned transformation. The acquired two-dimensional coordinate is provided to the display controller 44. The display controller 44 makes a predetermined display at a position corresponding to the two-dimensional coordinate in a frame memory, for example. The status is displayed in a display 45.

Figure 11:
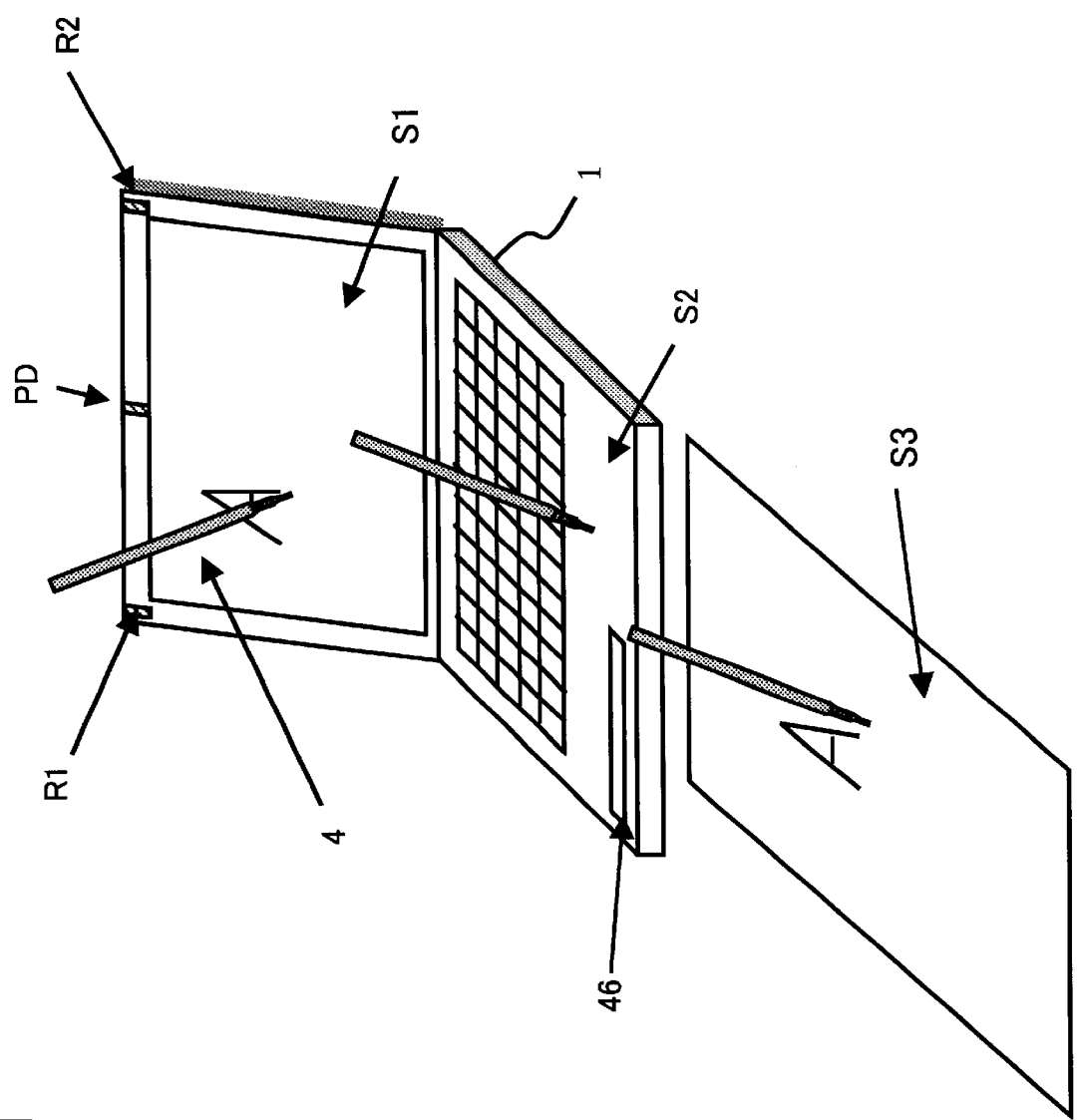
FIG. 11 is a representation showing a relation between a note-type personal computer and the input planes.

Next, the case where this embodiment is applied to a note-type personal computer with reference to FIGS. 11 to 14 will be explained. FIG. 11 is a representation showing a relation between a note-type personal computer 1 and its input planes. The input planes in this example are a display plane S1 of the note-type personal computer 1, an upper plane 2 of a body in front of the keyboard, and a plane S3 of a desk on which the body is placed. When writing down on the display plane S1 by the pen type input device 4, a position of the input device 4 is detected and reflected to the display. In other words, this is same as a so-called touch panel system. When writing down on the upper plane S2 of the body by the input device 4, a position on the upper plane S2 of the body is detected and reflected to the display. Accordingly, this function serves as same one as a tablet incorporated into the upper plane of the body. Furthermore, the pen front end is a ball-point pen core which can get in and out. When writing down on a paper S3 placed on a desk by the ball-point pen, its position is detected. As a result, the characters and images in the same manner as writing down on a paper can be input into the computer.

The two ultrasonic receivers R1, R2 are disposed at right and left ends on an upper side of the display S1, and an infrared rays receiver (photo-detector PD) is disposed at a center of the upper side. A pen holder 46 is provided on the upper plane of the body of the input plane S2, and when not using the pen 4, it is placed in the pen holder 4. When it is placed in the pen holder 4, a charging battery in the pen is charged from the personal computer 1. Furthermore, when the input pen 4 is placed in the pen holder 46, the ultrasonic waves can be transmitted according to a command by way of a holder contact electrode from the personal computer 1.

As mentioned later, the ultrasonic waves are transmitted from a known position of the input plane S2 to acquire distances to the receivers R1, R2, whereby an inclination angle of the display of the note-type personal computer can be automatically detected.

The position on the input plane S1 of the display can be acquired by the two ultrasonic receivers R1, R2 because of the position being the two-dimensional coordinate. On the other hand, in the input planes S2, S3 which are different from the plane S1 with the ultrasonic receivers R1, R2, their three-dimensional coordinate systems are set at the initial setting, and coordinate values of the receivers R1, R2 in their coordinate systems are acquired. Furthermore, a range of the input planes S1, S2, S3 also is set at the initial setting, and the respective input planes and the coordinate transformation parameters of the display screen also are set. When such the initial setting is ended, the coordinate input can be made from any one of the input planes S1, S2, S3 by the pen-type input device 4.

Figure 12A:
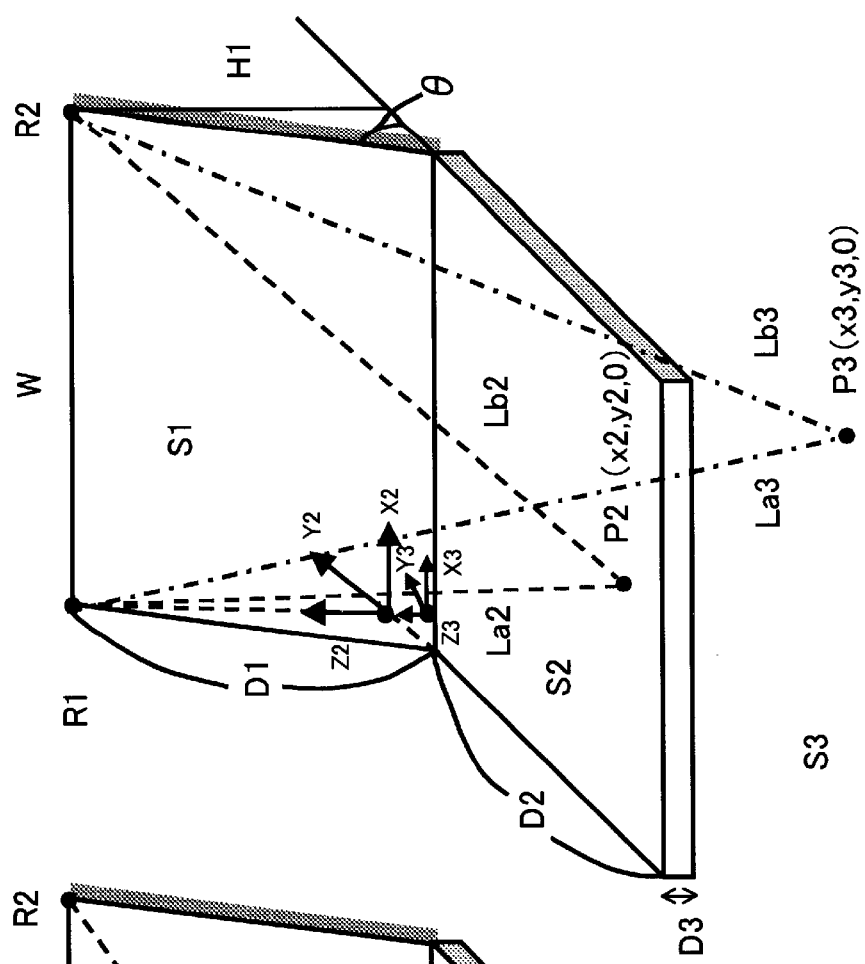
FIG. 12 is a representation for explaining detection of a position of the input device in the input planes.

FIG. 12 is a representation for explaining detection of a position of the input device in the input planes. FIG. 12A shows the case where the input device 4 is positioned at point P1 on the input plane S1 of the display. When the ultrasonic propagation time intervals T1, T2 from the input device to the receivers R1, R2 are detected, the respective distances La1, Lb1 are acquired by a product of the propagation time intervals T1, T2 and an ultrasonic wave speed V. When the display S1 is the input plane, it is not necessary to specify the three-dimensional coordinate system, but merely a two-dimensional coordinate has to be considered.

Now, assuming that the position of the receiver R1 is the origin of the two-dimensional coordinate X1-Y1, when width of the display plane S1 is W, coordinate of the receiver R2 is (W, 0). Accordingly, point P1(x1, y1) on the input plane S1 is:

$$x1^2+y1^2=La1^2$$

$$(x1-W)^2+y1^2=Lb1^2, \text{ and}$$

these simultaneous equations are solved, and then the coordinate value x1, y1 of point P1 is acquired as follows:

$$x1=(La1^2-Lb1^2+W^2)/2W$$

$$y1=(La1^2-x1^2)^{1/2}$$

Here, when a longwise length of the input plane S1 is D1, in the case of $0<x1<W$ and $-D1<y1<0$, it is detected that the input pen 4 is on the first input plane S1.

Figure 12B:
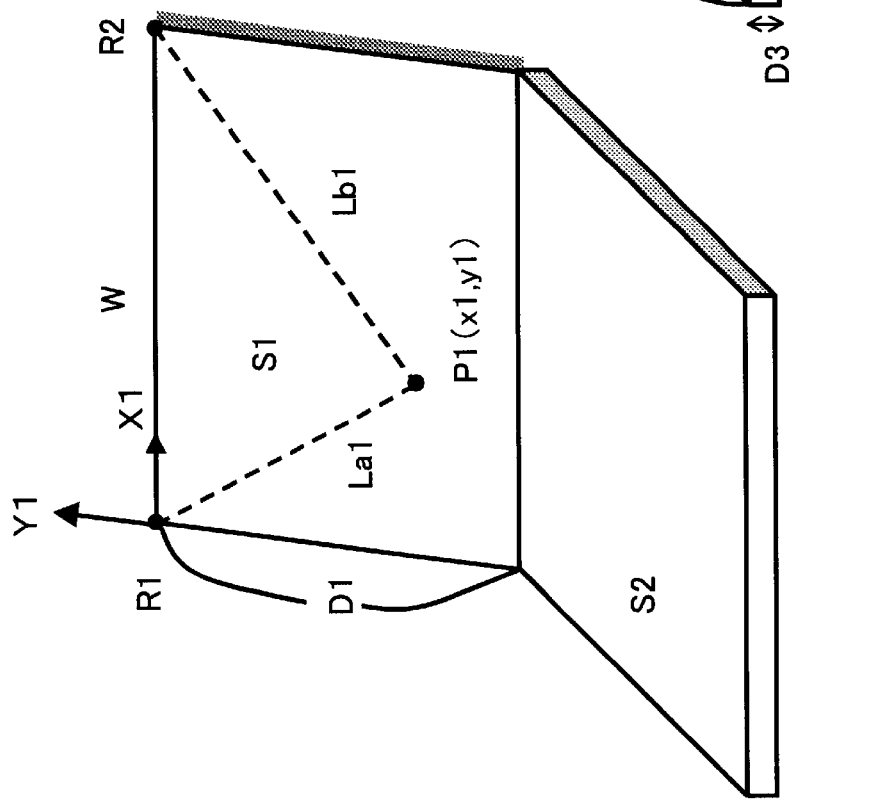

Next, FIG. 12B explains the case where the input pen is at point P2 on the second input plane S2. In this case, the three-dimensional coordinate system X2-Y2-Z2 of the input plane S2 is set so that a point in which a perpendicular line is lowered from the receiver R1 to the input plane S2 is set as the origin, and a direction of connecting both the receivers R1, R2 is set as X axis, a horizontal direction as Y axis, and a vertical direction as Z axis. As a length of the perpendicular line from the receiver R1 to the second input plane S2 is H1, the coordinate values of the receivers R1, R2 in the three-dimensional coordinate system X2-Y2-Z2 of the second input plane S2 are set to R1(0, 0, H1) and R2(W, 0, H1) by the initial setting. Furthermore, the range of the second input plane S2 is set as $0<x2<W$, and $-D1 \cos \theta-D2<y2<-D1 \cos \theta$.

Accordingly, point P2(x2, y, 0) on the input plane S2 is:

$$x2^2+y2^2+H1^2=La2^2$$

$$(x2-W)^2+y2^2+H1^2=Lb2^2, \text{ and}$$

these simultaneous equations are solved in x2 and y2, to acquire:

$$x2=(La2^2-Lb2^2+W^2)/2W \tag{13}$$

$$y2=-(La2^2-x2^2-H1^2)^{1/2} \tag{14}$$

Furthermore, the positions of the receivers R1, R2 in the three-dimensional coordinate system X3-Y3-Z3 of the third input plane S3 are set to R1(0, 0, H1+D3) and R2 (W, 0, H1+D3). Furthermore, the range of the input plane S3 is set to the range excluding the input planes S1, S2. And, point P3(x3, y3, 0) on the input plane S3 also is acquired in the same manner as above, as follows:

$$x3=(La3^2-Lb3^2+W^2)/2W \tag{15}$$

$$y3=-\{La3^2-x3^2-(H1+D3)^2\}^{1/2} \tag{16}$$

According to this embodiment, the input planes S1, S2, S3 are distinguished according to whether or not the coordinate values acquired in the respective coordinate systems are in the range of the input plane which was made the initial setting. In other words, it is judged that if $0<x1<W$ and $-D1<y1<0$, the input plane S1, if $0<x2<W$ and $-D1 \cos \theta-D2<y2<-D1 \cos \theta$, the input plane S2, and if other than above, the input plane S3.

A distance H1 changes according to angle θ of the display part of the note-type personal computer. The angle θ of the note-type personal computer is normally used at various angles. For this reason, at a time point when the display part of the note-type personal computer is opened and the angle θ is fixed, it is necessary to make the aforementioned initial setting. By so doing, the angle θ and the distance H1 are calibrated.

Furthermore, a speed of sound V changes according to temperatures, and as at the time of temperature T (° C.), it is represented by:

$$V=331.5+0.6 \times T \ [m/s],$$

when the temperature changes, a position of input point to be detected is deviated. Then, it is preferable that simultaneously with the distance H1, the speed of sound V is also measured (calibrated).

Figure 13:
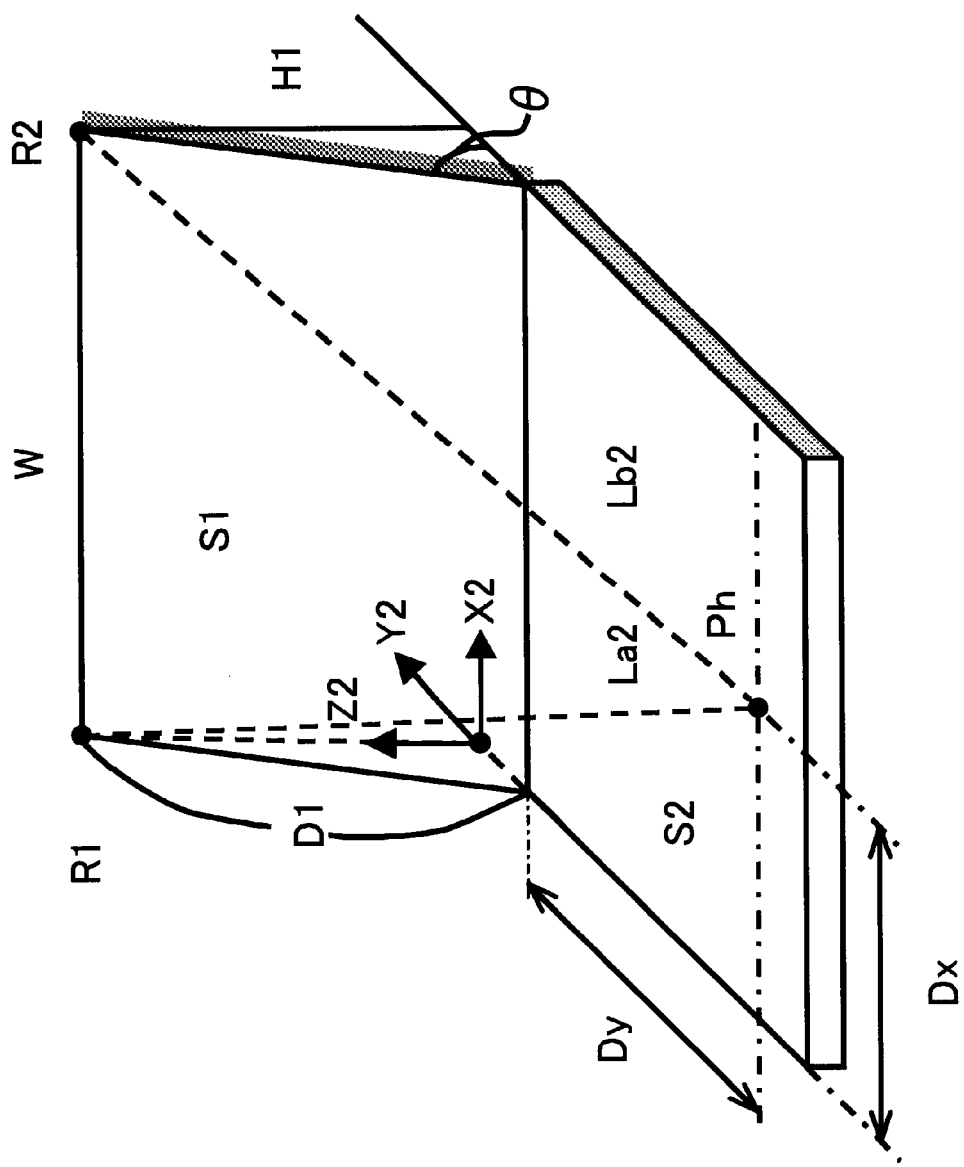
FIG. 13 is a representation showing a method for acquiring distance H1.

According to this embodiment, when the input pen 4 is held in the holder 46, this distance H1 can be measured. FIG. 13 is a representation for explaining such measurement. In FIG. 13, in a state that the input pen is placed in the pen holder 46, when the position of the ultrasonic transmission part of the pen is at distances of Dx, Dy from a left lower corner of the display part, in the coordinate system X2-Y2-Z2 of the input plane S2, pen position Ph (x2, y2, 0) is (Dx, −Dy−D1 cos θ, 0), and the positions of the receivers R1, R2 are R1 (0, 0, D1 sin θ) and R2 (w, 0, D1 sin θ). Therefore, when they are input in the simultaneous equation in the distances La2, Lb2 therebetween, $$(VT1)^2=Dx^2+(Dy+D1 \cos \theta)^2+(D1 \sin \theta)^2$$

$$(VT2)^2=(Dx-W)^2+(Dy+D1 \cos \theta)^2+(D1 \sin \theta)^2, \text{ and}$$

these are solved in V and θ, to obtain:

$$V=\{(W^2-2WDX)/(T2^2-T1^2)\}^{1/2}$$

$$\theta=ar \cos[\{(VT1)^2-Dx^2-D1^2-Dy^2\}/2D1D2]$$

That is, when in the pen holder, the personal computer generates a pen holder synchronous signal, and transmits the signal to the ultrasonic drive circuit by way of the holder contact electrode to transmit an ultrasonic pulse, and the receivers R1, R2 measure the time intervals T1, T2 from the synchronous signal to arrival of the ultrasonic pulse, whereby it is possible to measure (calibrate or make the initial setting of) a relation between the receivers R1, R2 and the input plane S2, and distance of the receivers R1, R2 and the input plane S2: H1=D1 sin θ.

At the time point when the display part of the note-type personal computer is opened, the calibration has only to be done once. However, when an angle changes, or temperatures changes largely during using, it is necessary to calibrate again. In that case, without placing the input pen in the pen holder each time, whenever the operator desires to calibrate, the operator issues calibration instruction to the personal computer, and when the operator inputs the designation position Ph of the pen holder by the input pen, the calibration can be done by the same computation.

Furthermore, when the ultrasonic transmitter is always housed in the position Ph separately from the input pen, even while the coordinate input is being made by use of the input pen, it is possible to calibrate all times. However, at that time, it should be confirmed for calibration that the input pen is in the air, and signals of infrared rays and ultrasonic waves are not transmitted during a specific time interval (for example, 1 sec) so that the ultrasonic waves from the input pen do not interfere with ones from the calibrating transmitter.

Furthermore, an angle sensor is incorporated in a hinge part of the display part of the note-type personal computer and the keyboard part, and the angle θ may be directly measured.

Furthermore, a specific position of the display part, for example, height H1+D3 of the receiver position and the desk, may be directly measured by a distance sensor. In that case, an ultrasonic rangefinder in which the receiver R2 is used as a transmitter to generate ultrasonic waves, and the ultrasonic waves reflected by the desk plane are received by the receiver is provided, and in this case a new sensor is not required.

Figure 14:
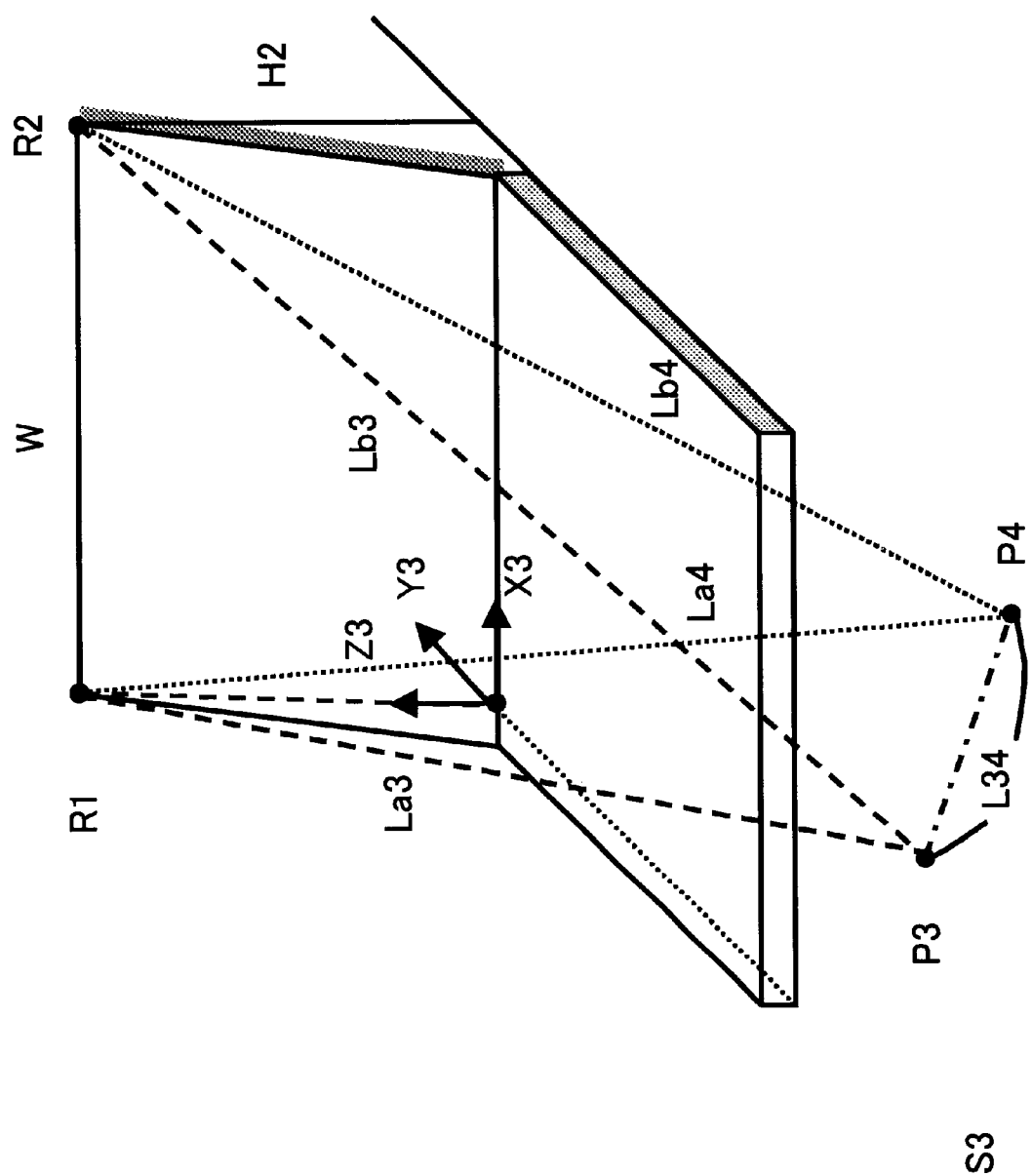
FIG. 14 is a representation showing another method for acquiring distance H2.

FIG. 14 is a representation showing another method for acquiring the distance H2. In this method, the coordinate inputs of 2 points away at the known distance on the input plane S3 are made. Assuming that points P3 (x3, y3, 0) and P4(x4, y4, 0) on the input plane S3 are away at distance L34, when the distances La3, La4 from each point to the receiver R1 and the distances Lb3, Lb4 from each point to the receiver R2 are measured at the time of calibration, the following relation is established:

$$x3^2+y3^2+H3^2=La3^2$$

$$(x3-W)^2+y3^2+H3^2=Lb3^2$$

$$x4^2+y4^2+H2^2=La4^2$$

$$(x4-W)^2+y4^2+H2^2=Lb4^2$$

$$(x3-x4)^2+(y3-y4)^2=L34^2$$

As there are five equations with respect to the unknown x3, x4, y3, y4, H2, when these are solved, it is possible to acquire distance H2 of the third input plane S3 and the receiver R1. For example, 2 points away at distance L34 are printed on a paper, and the paper is placed appropriately on the desk, and 2 points of the paper are designated, thereby calibrating the distance H2. When this paper is rotated or deviated in position with respect to the three-dimensional coordinate system, the ultrasonic waves are transmitted from the origin of the two-dimensional coordinate axis printed on the paper and the known point on one coordinate axis, so that in addition to the distance H2, a relation of the three-dimensional coordinate and the two-dimensional coordinate can be made the initial setting.

Furthermore, according to the aforementioned embodiment, an infrared ray light-emitting element LED is attached to the input pen, however the infrared ray light-emitting element LED can be provided in a receiving unit, and the light receiving element PD can be attached to the input pen, in which when the input pen receives infrared rays of a synchronous signal, the ultrasonic waves may be transmitted by the input pen.

Furthermore, two ultrasonic transmitters may be attached to the receiving unit, and one ultrasonic receiver may be attached to the input pen. In this case, the transmissions are alternately made so that the two ultrasonic transmissions are not interfered with each other. First, distance L1 between the first transmitter and the input pen is measured, and next distance L2 between the second transmitter and the input pen is be measured. Furthermore, according to this embodiment synchronization is made by infrared rays, such synchronization may be made by a radio or a wire provided in the input pen.

Incidentally, in the example of FIG. 11, a line connecting the receivers R1, R2 is always in parallel to the input plane, but as explained in FIGS. 1 and 3, even when not in parallel, if the aforementioned relational equation is modified, it is possible to acquire in the same manner.

According to the above embodiments, the infrared rays are utilized for the synchronizing means, and by utilizing the one ultrasonic transmitter and the two ultrasonic receivers, or the two ultrasonic transmitters and the one ultrasonic receiver, it is possible to make the coordinate input from the input device on the plurality of input planes. The synchronizing means can be also realized by the radio or wire. Furthermore, it is possible to utilize ultrasonic waves as the synchronizing means.

According to the following example, the ultrasonic transmitter is provided in the input device also, and the two ultrasonic receivers are provided at predetermined positions, and further an additional ultrasonic receiver is utilized as the synchronizing means. By employing a difference in ultrasonic reception times between the synchronizing ultrasonic receiver and the two receivers, the input coordinate from the plurality of input planes is detected. The relation between positions of the two ultrasonic receivers and the plurality of input planes is same as the aforementioned embodiment. Accordingly, in the following example, the three ultrasonic receivers in total are required. However, as the synchronizing means utilizing the infrared rays is not required, the total cost is lower than the prior art.

Figure 15:
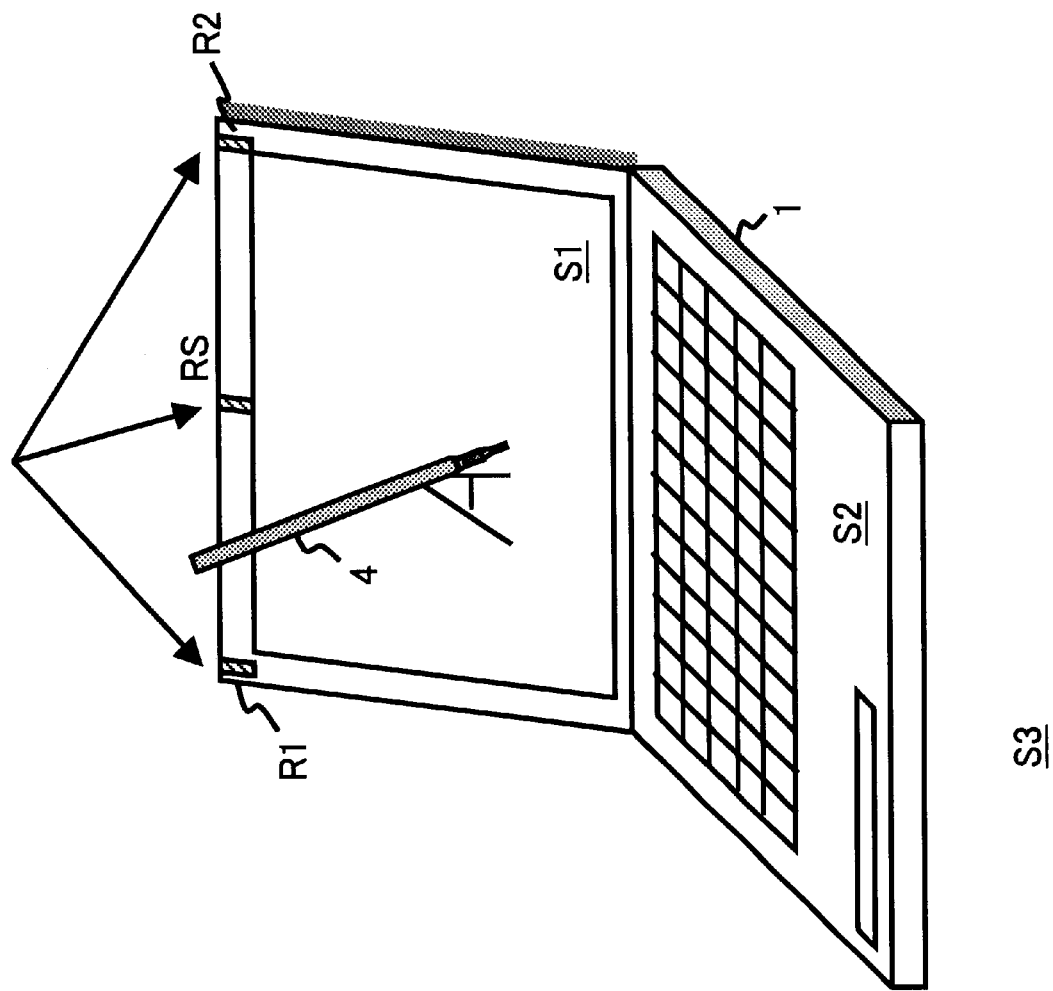
FIG. 15 is a view showing a coordinate input device which utilizes ultrasonic waves for a synchronizing means.

FIG. 15 is a view showing a coordinate input device which utilizes ultrasonic waves for the synchronizing means. Similarly to FIG. 11, the two ultrasonic receivers R1, R2 are provided at both ends of an upper part of the display part of the note-type personal computer, and also ultrasonic receiver Rs for a synchronizing means is provided therebetween. And, by employing a difference between a propagation time from the input pen 4 to the transmitting ultrasonic synchronizing receiver Rs and a propagation time therefrom to the two receivers R1, R2 at both the ends, the position of the input pen in the input planes S1, S2, S3 is detected.

Figure 16B:
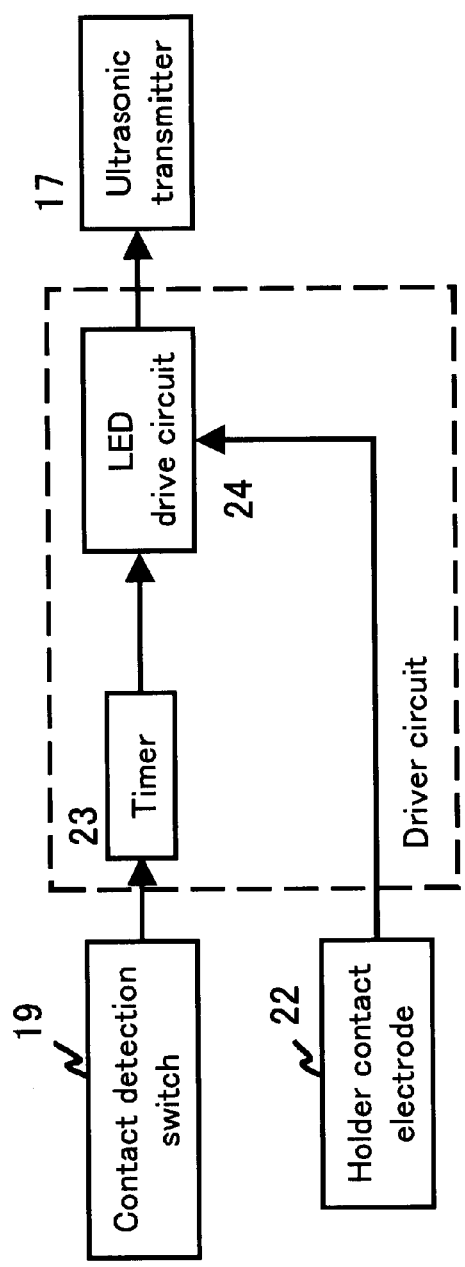
FIG. 16 is a view showing a configuration of the input device as an input pen of FIG. 15.
Figure 16A:
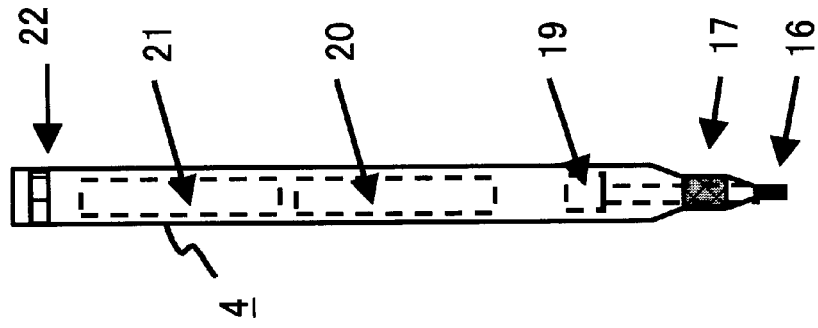

FIG. 16 is a view showing a configuration of the input device as the above input pen. The same reference number is provided to a position corresponding to FIG. 4. In the example of FIG. 15, it is unnecessary that the infrared rays light-emitting element LED as the synchronizing means is provided in the input pen. Accordingly, in the input pen 4, the ultrasonic transmitter 17 is driven by the contact detection switch 19 and the holder contact electrode 22. When the contact detection switch 19 detects that the ball-point pen core 16 is pressed against the input plane, a trigger signal is generated from the timer 23 in a fixed period, and the ultrasonic drive circuit 24 drives the ultrasonic transmitter 17. Furthermore, when the holder contact electrode 22 receives the drive signal also, similarly, the ultrasonic transmitter 17 is driven.

Figure 17:
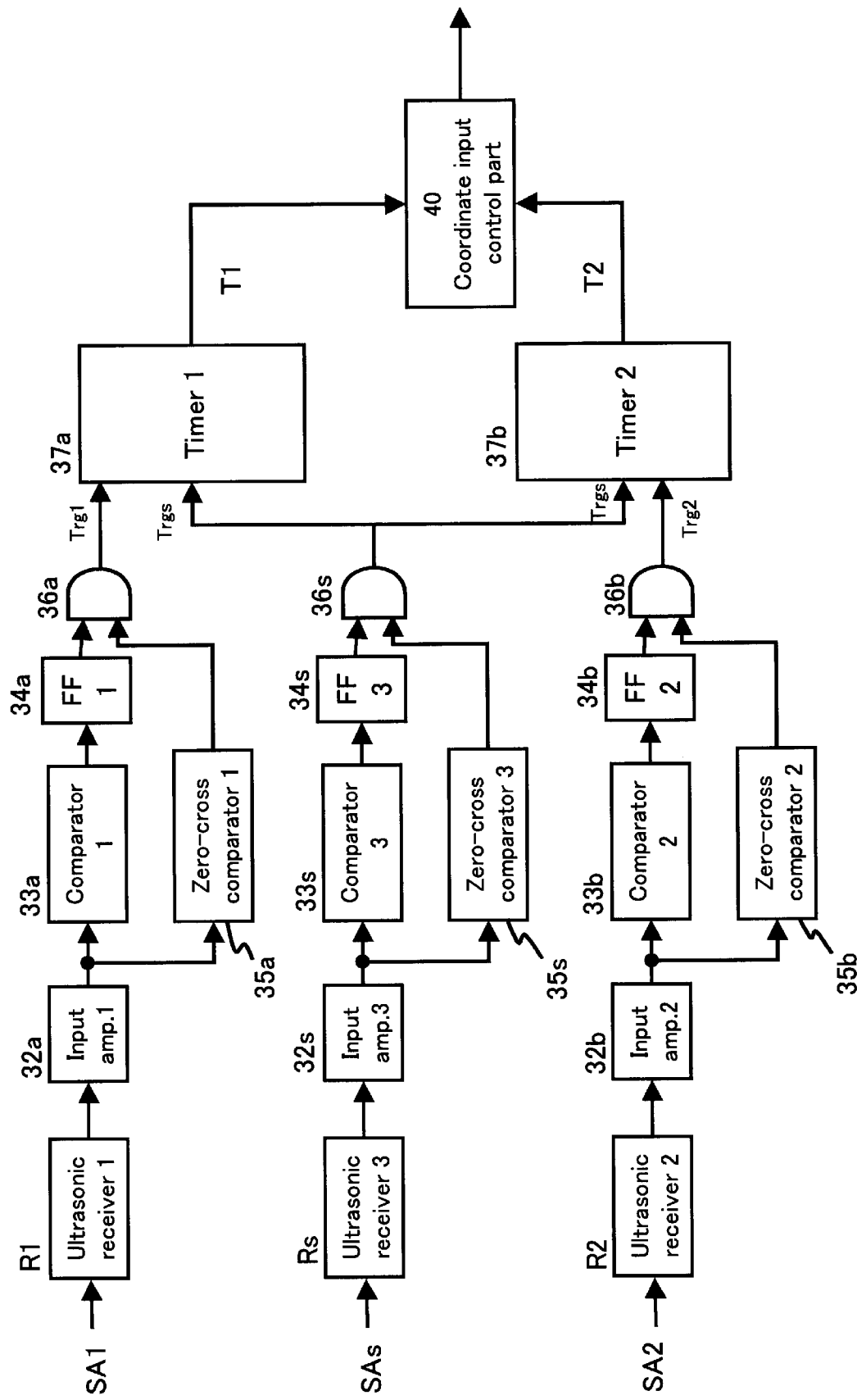
FIG. 17 is a configurational view of the reception part for processing ultrasonic waves received by two ultrasonic receivers R1, R2 and a synchronizing ultrasonic receiver Rs.
Figure 18:
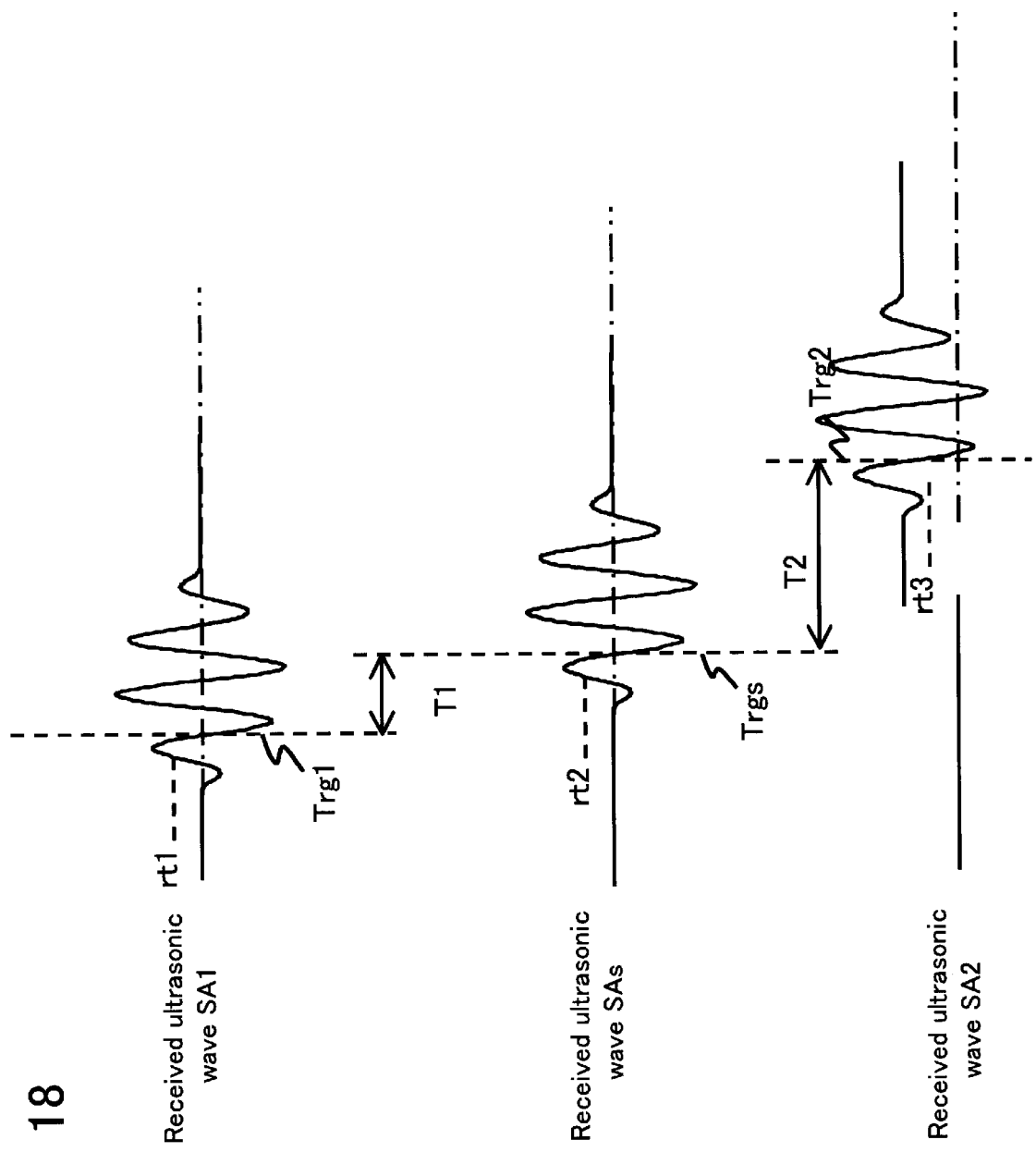
FIG. 18 is a timing chart of the received ultrasonic waves in FIG. 15.

FIG. 17 is a configurational view of the reception part for processing ultrasonic waves received by the two ultrasonic receivers R1, R2 and the synchronizing ultrasonic receiver Rs. FIG. 18 is a timing chart of the received ultrasonic waves. Instead of the infrared rays receiver (photo-detector PD) in the reception part shown in FIG. 6, the reception part of FIG. 7 is provided with the ultrasonic receiver Rs, along therewith, an input amplifier 32s, a comparator 33s, a flip-flop 33s, a zero-cross comparator 35s, and an AND gate 36s. These operations are same as in circuits corresponding to the ultrasonic receivers R1, R2.

Accordingly, as shown in FIG. 18, a timing of a zero-cross point after the ultrasonic waves received by the receivers R1, R2 exceed a predetermined threshold respectively, is detected, and detection signals Trg1, Trg2 are generated. Furthermore, a timing of ultrasonic waves received by the receiver Rs is similarly detected, and a synchronizing detection signal Trgs is generated. A timer 37a measures a difference T1 between the reception timing Trg1 of the first receiver R1 and the reception timing Trgs of the synchronizing receiver Rs. Furthermore, a timer 37b measures a difference T2 between the reception timing Trg2 of the second receiver R2 and the reception timing Trgs of the synchronizing receiver Rs. According to these timing differences T1, T2, the coordinate input controller 40 acquires the input coordinate of the input pen.

FIG. 19 is a representation for explaining detection of a position of the input pen. First, the case of the input plane S1 of FIG. 19A will be explained. As a locus of a point in which a distance difference between two points is constant becomes a hyperbola, it can be considered that an intersection of two hyperbolas specified by the distance difference between the two points R1, Rs and the distance difference between the two points R2, Rs, respectively, is the position of the input pen. Then, in the case of the input plane S1, a distance difference K1 between the receivers R1, Rs and a distance difference K2 between the receivers R2, Rs are:

$K1=L1-Ls=VT1$ $K2=Ls-L2=VT2$, and when the synchronizing receiver Rs is the origin of the three-dimensional coordinate system, the input point P1 (x1, y1) is acquired by solving the two equations of the hyperbolas in x1, y1:

$(x1+W/4)^2(4K1^2-W^2)/4K1^2+y1^2=(4K1^2-W^2)/16$ $(x1-W/4)^2(4K2^2-W^2)/4K2^2+y1^2=(4K2^2-W^2)/16$

Furthermore, in the case of the input planes S2, S3 also, similarly, the input points P2 (x2, y2) and P3 (x3, y3) are acquired from the two equations of the hyperbolas.

Even according to this embodiment, the line connecting the two ultrasonic receivers R1, R2 and the input plane not perpendicular can be employed. The initial setting in that case and the method for calibrating height H1 are same as in the aforementioned embodiment. Furthermore, the receivers R1, R2, Rs are provided so as to be uniformly spaced in a straight line, and the straight line is always in parallel to the input plane, but this embodiment is not limited thereto, and the receivers R1, R2, Rs are not in the straight line. Furthermore, any receiver may be used for synchronizing.

Figure 20:
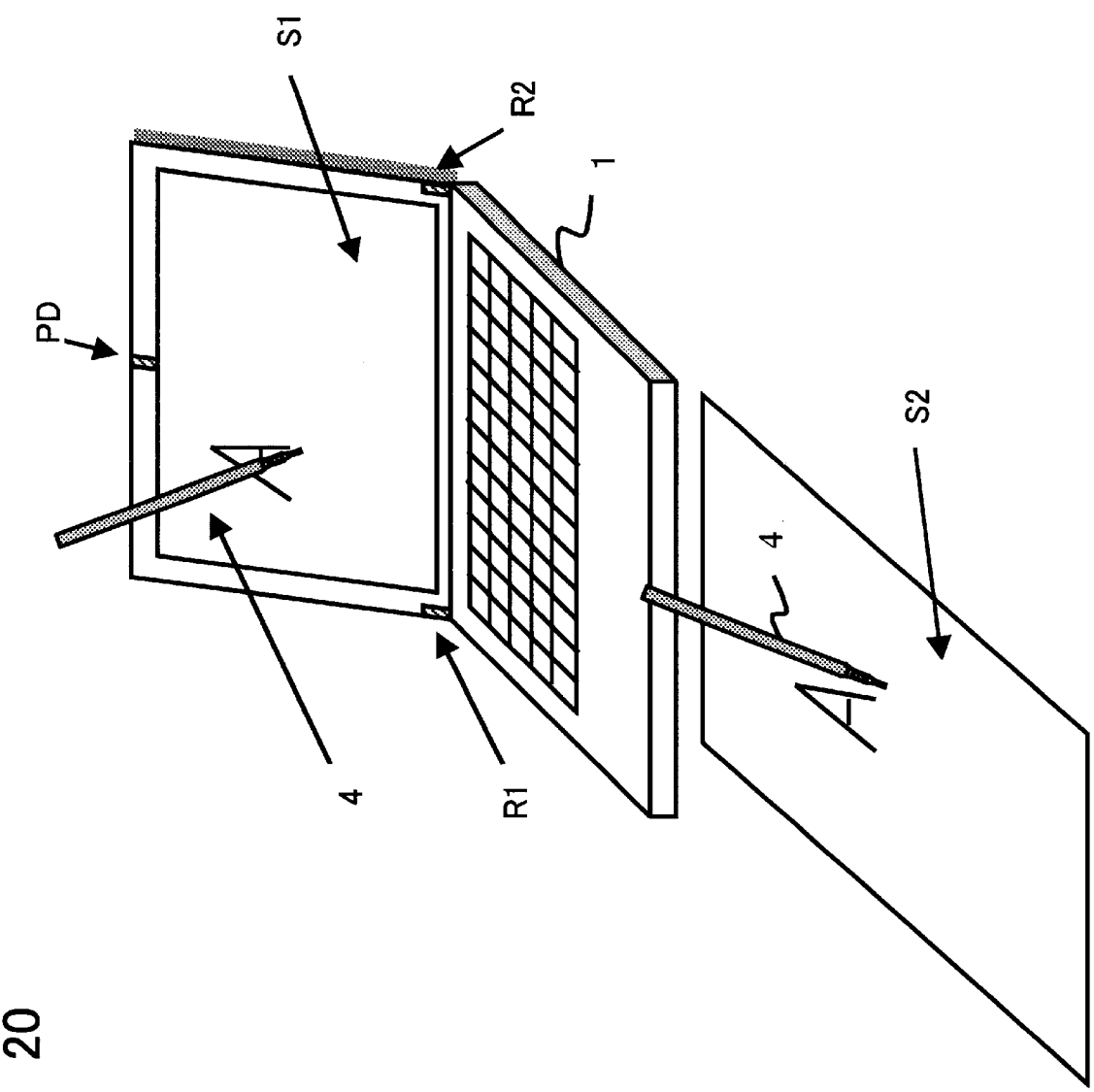
FIG. 20 is a modified example of the coordinate input device attached to the note-type personal computer.

FIG. 20 is a modified example of the coordinate input device provided to the note-type personal computer. In this example, the two ultrasonic receivers R1, R2 are stationed in the vicinity of a boundary between the display of the note personal computer 1 and the keyboard part. In this case, the display S1 and the desk plane S2 can be employed as the input plane. The two receivers R1, R2 are in the same plane as the first input plane S1 of the display, and further height from the two receivers R1, R2 to the second input plane S2 on the desk is substantially thickness of the keyboard part even if an inclination of the display part changes. Accordingly, even if an inclination of the display part changes, it is unnecessary to calibrate the inclination.

However, in this example, since a surface of the keyboard part cannot be distinguished from the display part in the distance from the receivers R1, R2, the key board part cannot be utilized as the input plane. However, if a function of instructing in advance which input plane is employed, from the operator to the computer, is provided as an application program in the computer, as the coordinate input generator can distinguish the display S1 from the keyboard part, it is possible to utilize both the planes as the input plane.

Figure 21:
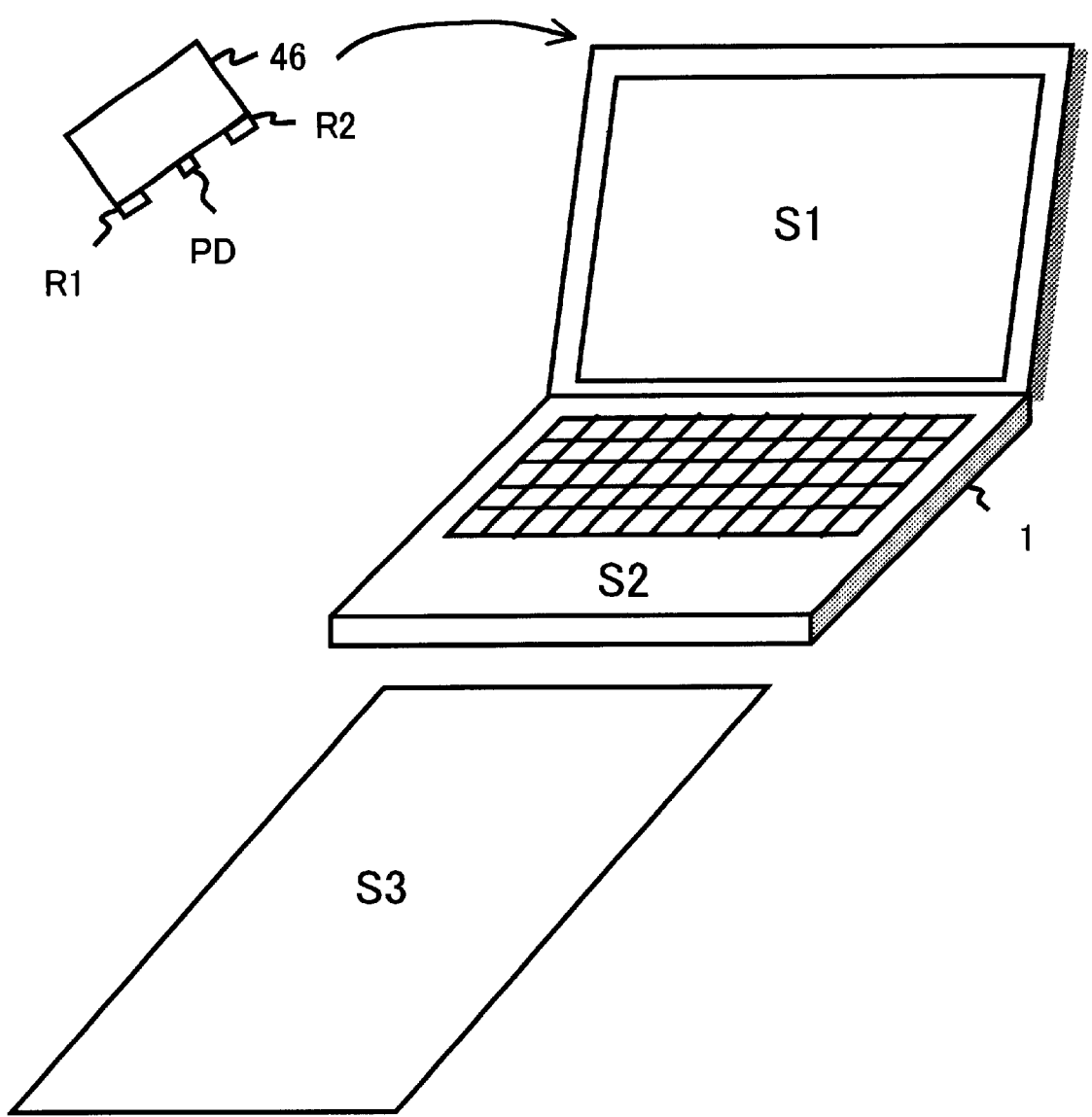
FIG. 21 is a modified example of the coordinate input device attached to the note-type personal computer.

FIG. 21 is a still modified example of the coordinate input device provided to the note-type personal computer. In this example, a receiving unit 46, to which the two ultrasonic receivers R1, R2 and the infrared rays receiver (photo-detector PD) are attached, having internally the reception part 30, the input coordinate generator 42, the input plane setting part 41, the initial setting value recording means 43, and the like (refer to FIG. 8) is utilized. This receiving unit 46 is attached to, for example, a left upper corner of the display part of the note-type personal computer 1, and the input coordinates from the three input planes S1, S2, S3 are detected in the aforementioned principle.

Figure 22:
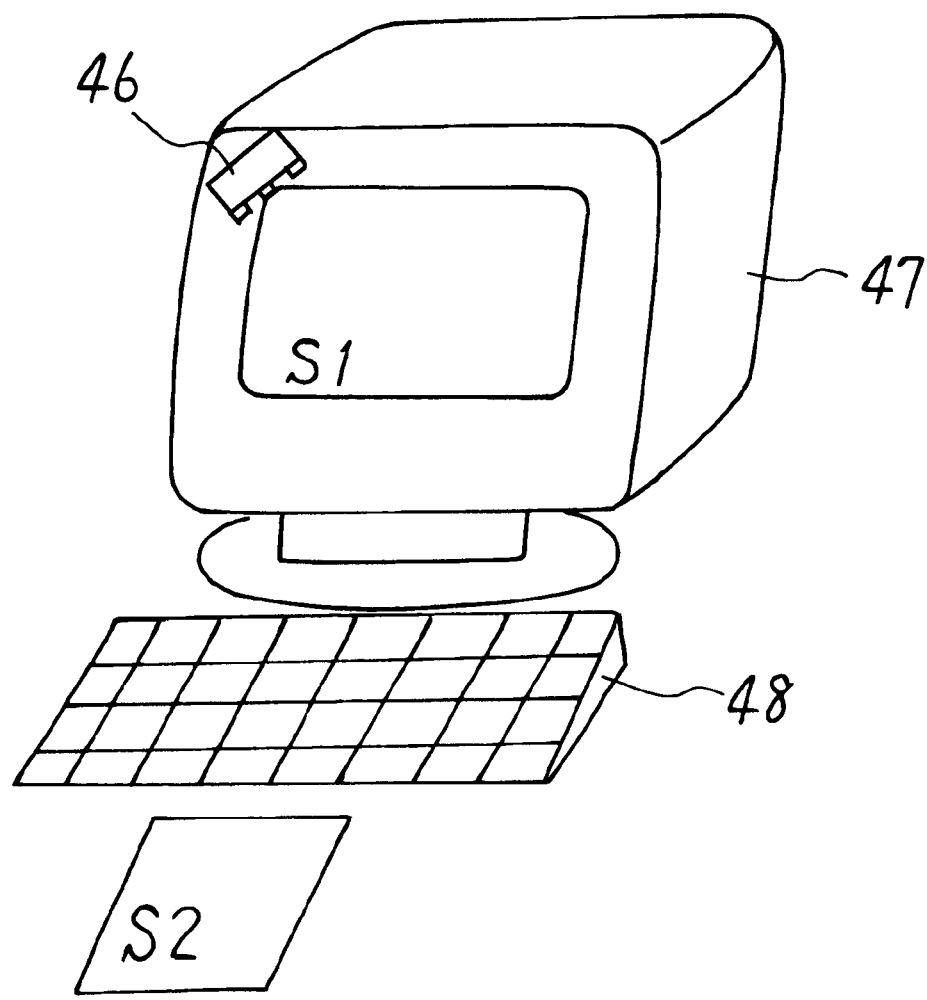
FIG. 22 is a modified example of the coordinate input device which is utilized for a desktop-type personal computer.

FIG. 22 is a modified example of the coordinate input device which is utilized for the desktop-type personal computer. In this example, the receiving unit 46 is attached to the left position in the upper part of a CRT display 47. As the input plane, the desk plane S2 in front of the display part S1 and the keyboard 48 is utilized.

Figure 23:
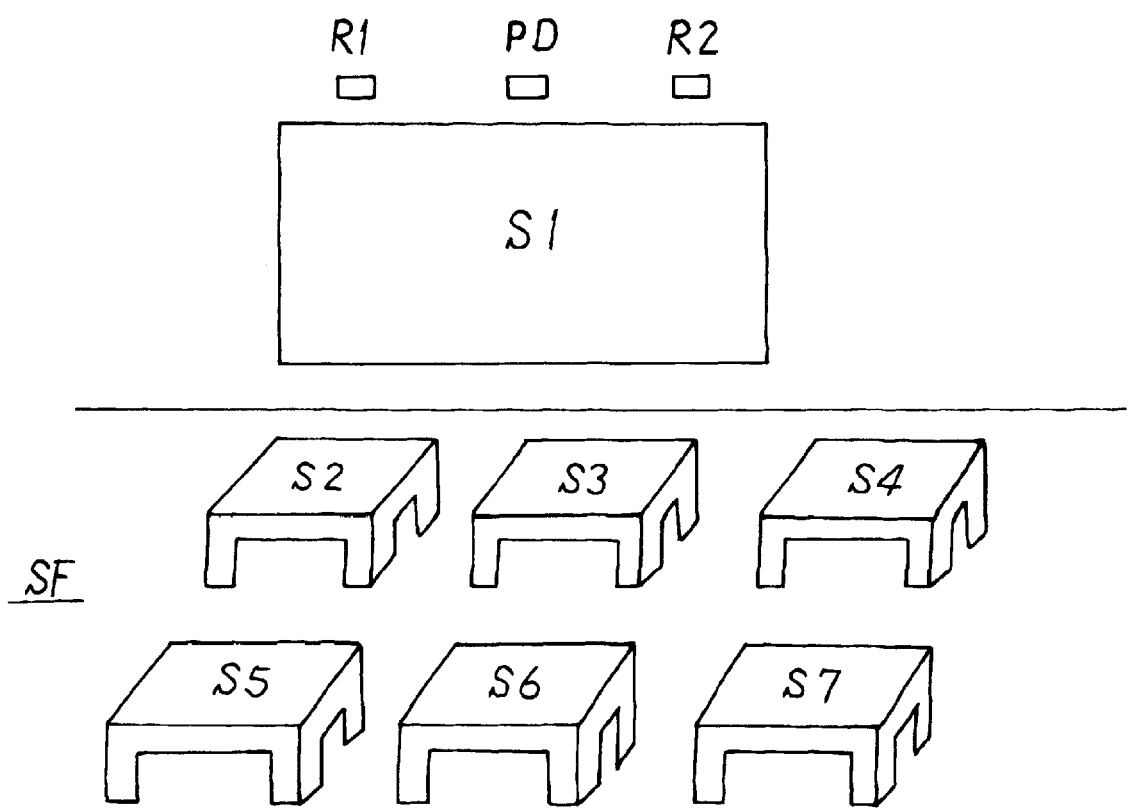
FIG. 23 is an example of the coordinate input device to be exploited for a conference room.

FIG. 23 is an example of the coordinate input device to be employed for a conference room. The two ultrasonic receivers R1, R2 are provided at both ends in the upper part of the black board S1 of the conference room, and the infrared rays light-receiver PD is provided at its center. The plurality of desk planes S2 to S7 arranged on a floor plane SF are also utilized as the input plane. As the black board S1, a screen of the computer may be used, or a display screen of a projector may be used.

In this case, as the desk planes S2 to S7 are stationed in the same plane, it is necessary that regions of the respective desk planes S2 to S7 have been beforehand registered in a plane shifted by height of the desk from the floor plane SF. Thus, the two-dimensional coordinates on the respective desk planes are recorded in the computer (not shown) as the input coordinate.

Configurational Example of Input Pen

As explained by FIG. 21, according to the present invention, the receiving unit 46 is attached to the display screen of the note-type personal computer, and the initial settings of the display screen S1 and the write-down plane S3 are carried out, whereby the input pen is pressed to the respective planes on the display screen S1 or the write-down plane S3, and then the coordinate input can be made into the personal computer. In the case, the display screen of the note-type personal computer 1 is, in many cases, a liquid crystal display panel.

Since a thin glass plate is provided on a surface of the normal liquid crystal display panel, when the panel surface is touched by the normal input pen, it is caused that the surface glass plate is damaged, and it is necessary not to damage the glass plate of the panel surface by the input pen. It may be considered that the glass plate is thickened in order to protect the panel surface, but resulting in forming the display panel of a peculiar structure, un-preferably. On the other hand, the input pen having a core having a write-down function such as a ball-point pen core, or the like is suitable for the write-down plane such as paper or the like so that handwriting is left behind on the write-down plane. Accordingly, it is necessary that the input pen has the different structure between the liquid crystal display panel plane S1 and the write-down plane S3.

The input pen according to this embodiment is structured that, considering the aforementioned views, the core capable of writing down such as a ball-point pen, or the like is utilized for the write-down plane such as paper, or the like, and a stroke of the contact detection switch (movement of the core from push-in of the pen point to stop thereof) is relatively small, thereby facilitating the write-down on the write-down plane. On the other hand, the input pen has a soft pen point for the liquid crystal display panel so as not to damage the panel surface, and the input pen has a structure that a stroke of the contact detection switch is prolonged and a pushing pressure when touching the panel surface is relatively weak. In other words, if the pen point of the input pen is firmer than the panel surface of the liquid crystal display, the pen point damages the panel surface when inputting, therefore the pen point is softened. Furthermore, if the pushing pressure of the pen point against the panel surface is strong, a large force is applied on the glass plate on the panel surface, and the glass plate may be cracked or crazed, therefore the pushing pressure is weakened. When the stroke of the pen point for turning on the contact detection switch is short, even if the pushing pressure of the pen point is weak, after the pen point moves by a stroke, a large pressure is applied on the panel surface. Therefore, it is desirable that the stroke is relatively long.

Figure 24:
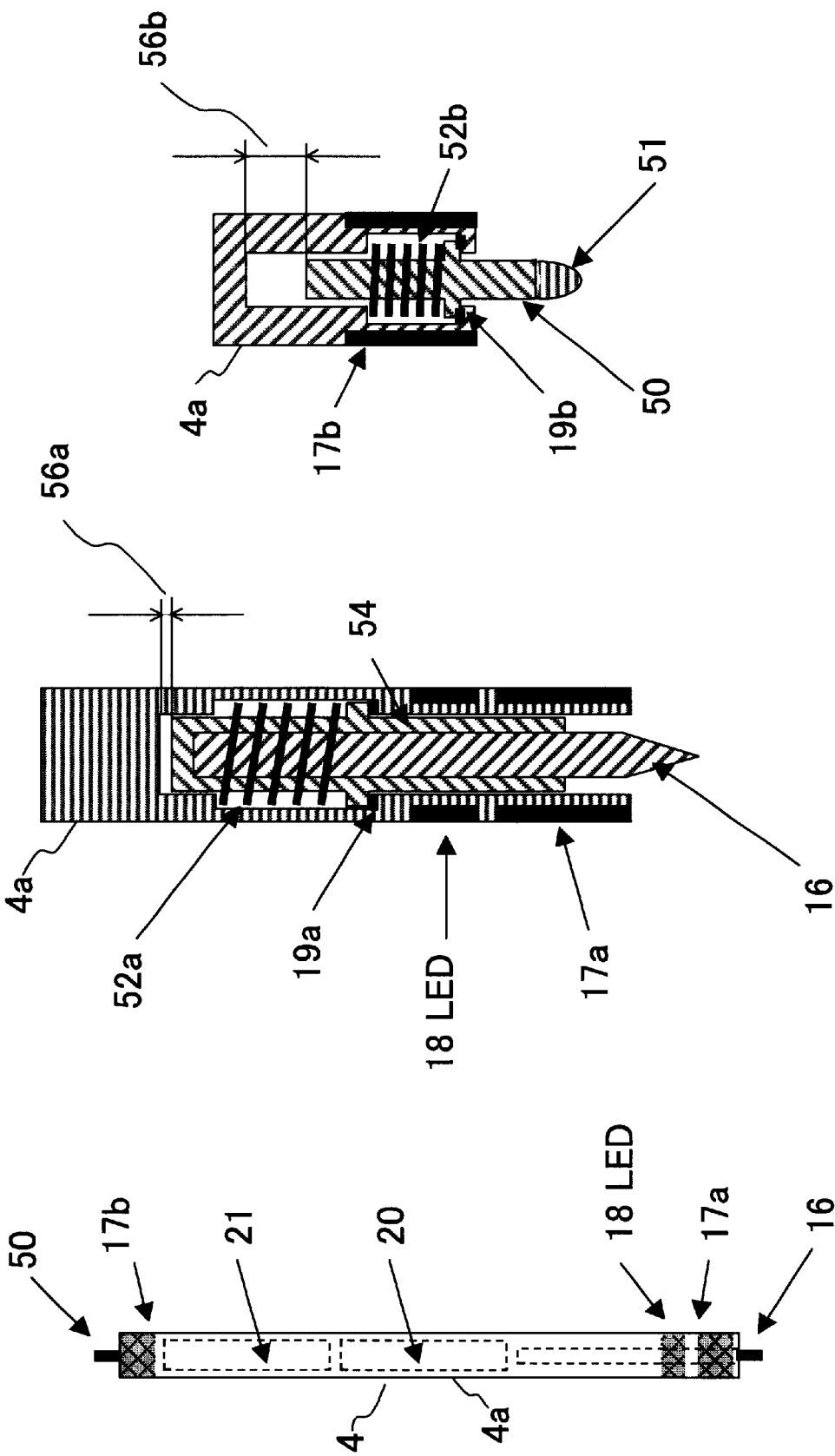
FIG. 24 is a configurational diagram of the input pen according to this embodiment.

FIG. 24 is a configurational diagram of the input pen according to this embodiment. FIG. 24A is a configurational diagram of the entire input pen, FIG. 24B is configurational diagram of a write-down plane pen point, and FIG. 24C is a configurational diagram of a display panel surface pen point. In the input pen 24 of FIG. 24, the write-down plane ball-point pen core 16 is provided at one front end part, and a display panel surface touch core 50 is provided at the other front end part. As shown in FIG. 24A, in a body 4a of the input pen 4, the drive circuit 20, the driving battery 21, and the infrared rays LED 18 are provided, respectively. The ball-point pen core 16 and a first ultrasonic transmitter 17a are provided at one front end, and the touch core 50 and a second ultrasonic transmitter 17b are provided at the other front end, respectively. The ultrasonic transmitters 17 are configured by a cylindrical piezoelectric film made of polyvinylidence fluoride, respectively, and have directivity at 360°. Furthermore, in the infrared rays LED 18, for example, three LEDs of directivity 120° are stationed every 120°, thereby realizing the directivity of 360°. It involves the directivity of 360°, whereby even if the input pen rotates, the infrared rays and ultrasonic waves can reliably reach the receiving unit.

As shown in FIG. 24B, in the configuration of the write-down plane pen point, a core holder 54 for accommodating the ball-point pen core 16 is accommodated in the body 4a of the input pen, and is pressed downward by a first spring 52a, and is stopped upward in a part of a first contact detection switch 19a. As it is necessary that the ball-point pen core itself is exchanged due to exhaust of an ink by writing down, it is detachably accommodated in the core holder 54. And, it is designed to such a degree that a distance of an upper end of the core holder 54 and the pen body 4a can ensure a relatively short first stroke 56a. Accordingly, when the ball-point pen core 16 of the input pen 4 is pressed to the write-down plane, a projection of a side plane of the core holder 54 is separate from the contact detection switch 19a, so that it can be detected that the ball-point pen core 16 comes into contact with the write-down plane. When the pen point is pressed to the write-down plane, the first spring 52a is contracted, and a pushing pressure generates. When the core holder 54 moves by the first stroke 56a, its upper end part reaches the pen body 4a, and the pushing pressure by a user of the input pen is transmitted to the pen point, as it is.

It is desirable that the first stroke 56a is 0.5 mm or less so that a user's writing sensation does not get worse, and when about 0.2 mm, for example, the user can write down in a normal ball-point pen sense without scarcely feeling a stroke. Furthermore, the pushing pressure of the first spring 52a is set to be about 1 gf and very small.

As shown in FIG. 24C, a front end protection part 51 made of a soft material for preventing damages on a surface of the display panel is provided at a front end of the touch core 50. A shape of the touch core 50 is analogous to the core holder 54 of the ball-point pen core, and a side face projection part is stopped upward by the second contact detection switch 19b, and is pressed downward by a second spring 52b. It is designed to such a degree that a distance of an upper end of the touch core 50 and the pen body 4a has a relatively long second stroke 56b.

It is preferable that the second stroke 56b is set to be relatively long, for example, 2 mm or more so that the user of the input pen can perceive that the front end of the touch core 50 comes into contact with the panel surface and is pulled inside, more preferably about 3 mm, for example. Furthermore, it is desirable that the second spring 52b has a pushing pressure of 10 gf or less, for example, so that it does not damage the surface of the display panel, and more preferably the pushing pressure is 3 gf, for example. The second stroke 56b is relatively long and a pressure of the second spring 52b is small to such a degree that it does not damage the panel surface, but it is large to such a degree that it lets the user perceive the contact. Therefore, while the touch core 50 comes into contact with the panel surface and retreats to a side of the pen body 4a by a distance less than the second stroke 56b, the user can perceive the contact of the touch core.

When the pen point of the input pen comes into contact with the write-down plane or panel plane, and the contact detection switch 19 detects it, as mentioned above, infrared rays are transmitted from the infrared rays LED 18 in a fixed period by the timer, and further ultrasonic waves are transmitted from the ultrasonic transmitter 17. The detection of the input pen coordinate by the receiving unit after that is as mentioned before:

In the case where a certain distance is present between the pen point of the input pen and the ultrasonic transmitter, when the input pen is inclined and the coordinate input is carried out on the write-down plane or display panel plane, an error occurs in the input position. In other words, as the input coordinate is acquired according to the distance from the ultrasonic transmitter to the receiving unit, when the distance of the ultrasonic transmitter and the pen point is larger, an error occurs in the input coordinate.

In that case, in the input pen of FIG. 24, as ultrasonic transmitters 17a, 17b are provided in upper and lower parts of the pen body 4a, it is possible to eliminate the error by utilizing the two ultrasonic transmitters.

Figure 25:
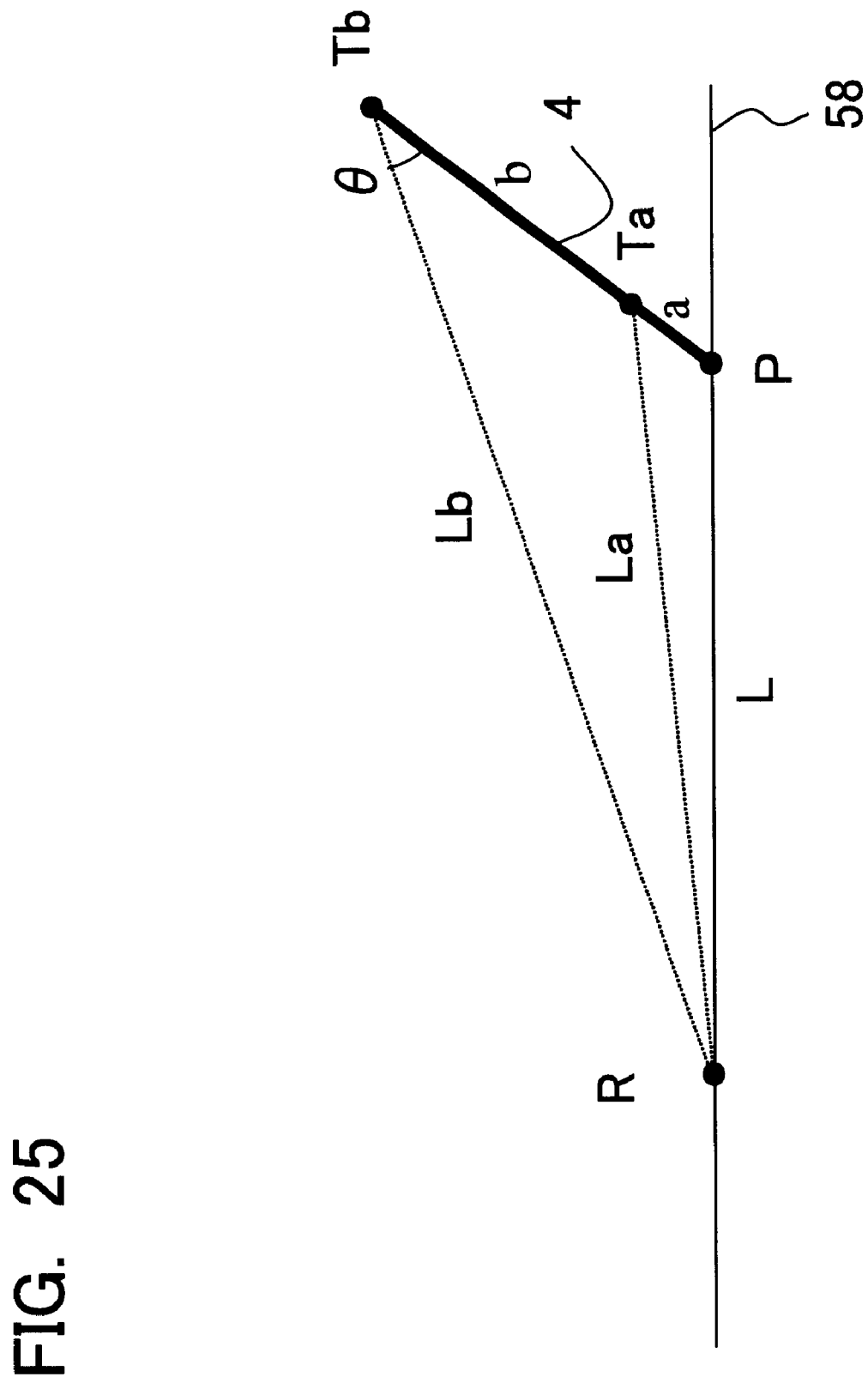
FIG. 25 is a view showing a plane containing a pen 4 and a receiver R.

As shown in FIG. 25, a plane containing the pen 4 and the receiver R will be considered. Assuming that with respect to a pen point P, a first ultrasonic transmitter Ta is at distance a from the pen point P, and further a second ultrasonic transmitter Tb is away at distance b from the first ultrasonic transmitter Ta, and then, a distance from the first ultrasonic transmitter Ta to the transmitter R is La, and a distance from the second ultrasonic transmitter Tb to the transmitter R is Lb. And, when considering triangle RPTb and triangle RTaTb, $$L^2 = Lb^2 + (a+b)^2 - 2(a+b)Lb \cos \theta$$

$$La^2 = Lb^2 + b^2 - 2b\, Lb \cos \theta$$

Accordingly, distance L from the pen point P to the receiver R is:

$$L = \{a^2 + ab + La^2(a+b)/b - Lb^2\, a/b\}^{1/2}$$

When both the distance from the front end of the ball-point pen core to the first ultrasonic transmitter and the distance from the front end of the touch core to the second ultrasonic transmitter are set to a, no matter which core is used, it is possible to accurately acquire the distance of the pen front end P and the receiver R by the above equations.

FIG. 26 is a representation showing infrared rays synchronous signals and ultrasonic received waves detected by the receiving unit R. In the case of using the ball-point pen core of FIG. 24, when the first contact detection switch 19a detects contact, pulses are transmitted from the first ultrasonic transmitter 17a after transmission of the infrared rays, and further, pulses are transmitted from the second ultrasonic transmitter 17b after a delay time Tp. After the receiver receives an infrared rays synchronous signal, arrival times T1, T2 of ultrasonic waves SA1, SA2 from the first ultrasonic transmitter are detected, and successively arrival times T3, T4 of the ultrasonic waves SA1, SA2 from the second ultrasonic transmitter are detected. When the delay time Tp is subtracted from the arrival times T3, T4, an actual pulse arrival time from the second ultrasonic transmitter is acquired. After that, it is possible to acquire the distance L from the pen point P to the receiver R by the above computation equations. When the core of the pen point continues to come into contact with the input plane, the first and second ultrasonic transmitters transmit alternately the ultrasonic pulses.

FIG. 27 is a diagram showing another configurational example of the input pen. In this example, as shown in FIG. 27A, the input core 16 and the ultrasonic transmitter 17 are provided only at one end of the input pen 4, and as shown in FIGS. 27B and 27D, the write-down plane ball-point pen core 16 and the display panel plane touch core 50 are attached to the pen body 4a so as to exchange them. FIG. 27C shows a touch core holder 58 for accommodating the touch core 50. In this example, the ultrasonic transmitter should be one.

The configuration shown in FIG. 27B is same as in FIG. 24B, and the ball-point pen core 16 is accommodated detachably in the core holder 54. When an ink of the ball-point pen is exhausted, it is necessary that the ball-point pen core 16 is exchanged. The core holder 54 is accommodated in the pen body 4a, and is pressed downward by the first spring 52a, and is stopped upward at a projection on a side plane by the contact detection switch 19. The core holder 54 can move vertically only by the first stroke 56a. The pressure of the first spring of the first stroke is same as in the case of FIG. 24.

On the other hand, as shown in FIG. 27C, the touch core 50 is accommodated in the touch core holder 58, and as shown in FIG. 27D, a touch core holder 58 is accommodated detachably in the core holder 54. And, the touch core 50 accommodated in the touch core holder 58 is pressed downward by the second spring 52b, and is stopped upward at the projection on the side plane. A touch core rod 60 of FIG. 27C has a sufficient length, to ensure the relatively long second stroke 56b. The front end protection part 51 is attached to a front end of the touch core 50. When the touch core holder 58 is accommodated in the core holder 54, as shown in FIG. 27D, a small pressure is applied on the display panel plane by the second spring 52b, and in the range of the total stroke of the second stroke 56b and the first stroke 56a, the touch core front end is retreated into the pen body. As the stroke range is sufficiently long, the pen's user can perceive contact with the display panel plane of the input pen while the touch core front end moves in the range.

Even in the input pen of FIG. 27, the ultrasonic transmitter can be provided at an upper end of the pen body. By so doing, as explained in FIGS. 25 and 26, it is possible to eliminate an error caused by a long distance of the ultrasonic transmitter 17 and the pen point.

Figure 28A:
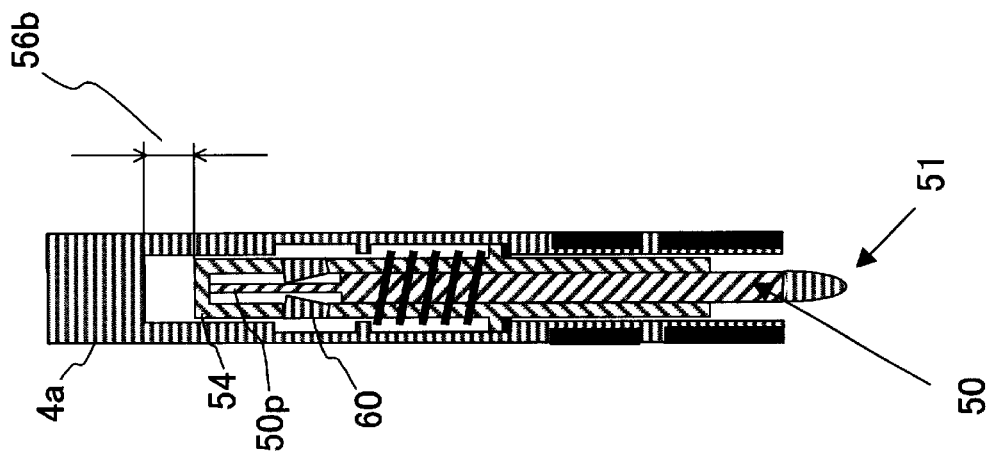
FIG. 28 is a cross-sectional view showing another configurational example of the input pen.
Figure 28B:
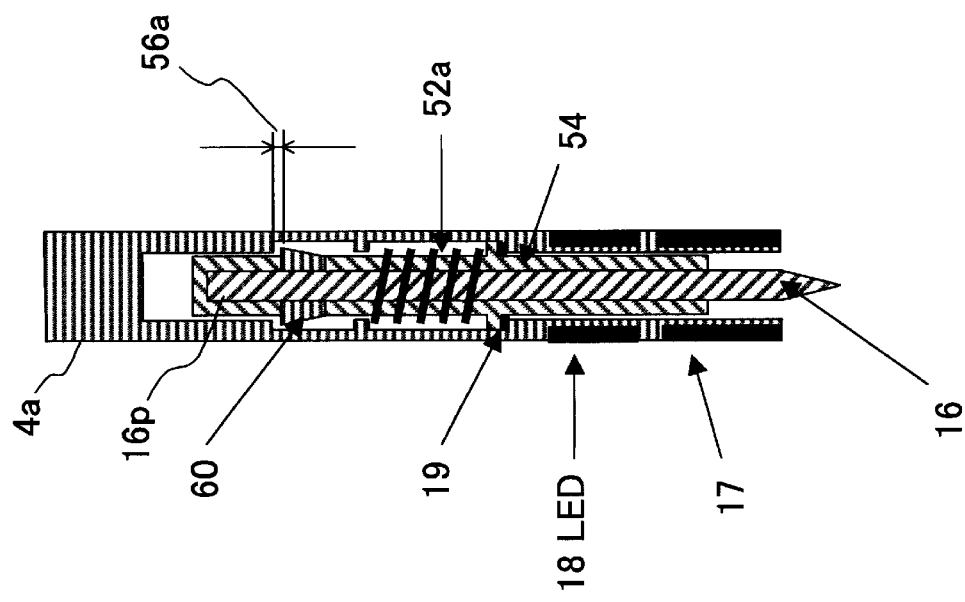

FIG. 28 is a cross-sectional view showing another configurational example of the input pen. FIG. 28A is a cross-sectional view in a state that the write-down plane ball-point pen core 16 is accommodated, and FIG. 28B is a cross-sectional in a state that the display panel plane touch core 50 is accommodated. In this example, the ball-point pen core 16 and the touch core 50 are accommodated detachably in the same core holder 54, and when the ball-point pen core 16 is mounted, the relatively short first stroke 56a is formed, and when the touch core 50 is mounted, the relatively long second stroke 56b is formed. For this reason, the stopper 60 having an elastic force in a central direction is provided at a center part of the core holder 54, and an upper end 16p of the ball-point pen core 16 is thick to press and expand the stopper 60 outward, to stop at a step of the pen body 4a, and an upper end 50p of the touch core 50 is fine to shrink the stopper 60 inward, to stop an upper end of the core holder 54 at an upper end of a hole of the pen holder 4a. As a result, the first stroke 56a is short and the second stroke 56b is long. In this example, when the ball-point pen core and the touch core are mounted, a stroke corresponding automatically is formed. Furthermore, as the pushing pressure when the touch core is mounted is determined by the spring 52a, the spring 52a has an elastic force to such a degree that that the display panel plane is not damaged and the user perceives the contact.

In the input pen of FIG. 28, it is possible to change also a stroke length by a hand-operated switch provided in the pen body 4a.

FIG. 29 is a cross-sectional view showing still another configurational example of the input pen. In this example, the touch core can be attached to the ball-point pen core, thereby making the coordinate input on the display panel plane. As shown in FIG. 29A, the ball-point pen core 16 is accommodated in the core holder 54, and further the core holder 54 is accommodated in a slide part 62 accommodated in the pen body 4a. The slide part 62 has a stopper 64, a function of forming the first stroke 56a relative to the upper end of the core holder 54 when using the ball-point pen core 16, and a function of sliding so as to retreat the front end of the touch core to the pen body 4a so as not to be too away from the ultrasonic transmitter 17 when the touch core is attached.

FIG. 29A shows the write-down plane input pen, and a slide switch 66 of the slide part 62 is slid on its downside, whereby the stopper 64 is pushed inside by a projection 65 on a side part of the pen body 4a, and the first stroke 56a is formed between the stopper 64 and the upper end of the core holder 54. In this example, the contact detection switch 19 is provided in the slide part 62.

FIG. 29B shows the touch core holder 58 for retaining the touch core 50. This touch core holder 58 is mounted to a groove 68 at a front end part of the slide part 62. As shown in FIG. 29C, the slide switch 66 of the slide part 62 is slid manually to its upside, and along therewith, the stopper 64 is removed from the projection 65 and expanded outside by the elastic force, and the second stroke 56b is determined by a length of a rod of the touch core 50. As the slide part 62 slides to its upside, the ultrasonic transmitter 17 at the front end of the pen body is positioned in close proximity to the front end of the touch core 50. FIG. 29D shows a state that the touch core 50 comes into contact with the display panel plane to retreat inside. As the stopper 64 is opened outside, the upper end of the core holder 54 moves to a higher position than the stopper 64.

FIG. 30 is further a cross-sectional view showing another configurational example of the input pen. This example has a structure that the write-down plane ball-point pen core and the display panel plane touch core are exchanged by pressing slides 72a, 72b like a knock-type multicolor ball-point pen. The core holder 54a accommodating the ball-point pen core 16 and the core holder 54b accommodating the touch core 50 in the pen body 4a are accommodated side by side. Strictly, the ball-point pen core 16 is detachably accommodated in an inside core holder 54c, which is pressed downward in an outside core holder 54a by the spring 52a, and is stopped on its upside by the contact detection switch 19a. The first stroke 56a is formed by a shape at the upper end part of the inside core holder 54c. Similarly, the touch core 50 is also accommodated in the core holder 54b, and is pressed downward by the spring 52b, and is stopped on its upside by the contact detection switch 19b. The relatively long second stroke 56b is formed by a shape at the upper end part of the touch core 50. The elastic forces of the spring on sides of the ball-point pen core and the touch core are same as in the above example.

The core holders 54a, 54b are pressed to its upside by springs 68a, 68b, respectively, and latches 70a, 70b composed of steps, notches 71a, 71b and slides 72a, 72b are provided. And, the slide 72b is pressed down from a state of FIG. 30A, whereby the notch 71b is pressed down on the touch core side, and the notch 71a on the ball-point pen core side is pressed and moved outside. Then, the latch 70a is slipped off from a lower end of a fixing part 74 and is returned to the upside by the spring 68a. On the other hand, the latch 70b on the touch core side is stopped at the lower end of the fixing part 74, resulting in a state that the front end of the touch core 50 projects from the pen front end. This is a state of FIG. 30B. In this state, the slide 72a is slid to its downside to be in a state of FIG. 30A.

FIG. 31 is further a cross-sectional view showing another configurational example of the input pen. This example has a structure that the ball-point pen core 16 is coaxial with the hollow touch core 50. Thus, it is possible to thin more than the pen body of FIG. 30. Furthermore, this example has a structure that the ball-point pen core 16 and the touch core 50 automatically get in and out according to an inclination of the input pen. When the coordinate input is effected from the write-down plane on the desk, the pen body is in a vertical direction, and when the coordinate input is effected from the display panel plane of the note-type PC, the pen body is in a horizontal direction. By detecting its inclination, the ball-point pen core and the touch core automatically get in and out.

The ball-point pen core 16 is detachably accommodated in the inside core holder 54c for the ball-point pen core, and the inside core holder 54c is further accommodated in the outside core holder 54a. The inside core holder 54c is pressed to its downside by the spring 52a, and is stopped upward by the contact detection switch 19a. And, the first stroke 56a is formed. Furthermore, the touch core 50 is accommodated in the pen body 4a, and is pressed to its downside by the spring 52b, and is stopped upward by the contact detection switch 19b.

As shown in FIG. 31A, when the pen body is in a vertical direction, a lower end of the stopper 78 moves inside around a support 80 by a weight 76 lowering to its downside, to stop the upper end of the outside core holder 54a. Thus, the first stroke 56a is formed. As shown in FIG. 31B, when the pen body is in a horizontal direction, the weight 76 is not lowered to its downside by an upside elastic force of the spring 52d, and the lower end of the stopper 78 is pressed and expanded outside, and the outside core holder 54c moves to its upside by the upside elastic force of the spring 52c. As a result, the hollow touch core 50 projects from the lower end of the pen. In this state, the relatively long second stroke 56b is formed. FIG. 31C shows a state that the touch core 50 comes into contact with the display panel plane to be pulled inside.

In the aforementioned example, the inclination of the pen was detected by the weight 76 and the spring 52d, but the ball-point pen core and the touch core may automatically get in and out by utilizing an inclination sensor like an acceleration sensor. Alternatively, the ball-point pen core and the touch core may manually get in and out. In that case also, as the ball-point pen core and the touch core have a coaxial structure, it is possible to fine the pen body.

In FIG. 21, the receiving unit 46 is attached to an outer periphery of the display panel of the note-type PC. In that case, in the case where the coordinate input is effected from the write-down paper plane S3, when the position of the write-down paper is misaligned during the input, a relative position to the receiving unit 40 changes and it is necessary to make the initial setting again.

Then, when the receiving unit 46 can be fixedly attached to the display panel of the note-type PC, or can be fixedly attached to the write-down paper, even if the write-down paper is misaligned as above, it is unnecessary to reset the initial setting.

FIG. 32 is a three-directional view showing the receiving unit capable of freely fixing to the plurality of input planes. FIG. 32A shows a plane view, FIG. 32C shows a front view, and FIG. 32B shows a side view. In this receiving unit, a butt edge 84 comprising a recess part to which the display panel or the write-down paper butts is provided in a body 82, and further a clip 86 and the spring 87 for pinching the display panel or the write-down paper are provided. The display panel or the write-down paper is pinched between front end parts 88 of the clip 86. The ultrasonic receivers R1, R2 are provided at both ends of the body 82, and the infrared rays receiver (photo-detector PD) is provided at a central position therebetween.

Figure 33:
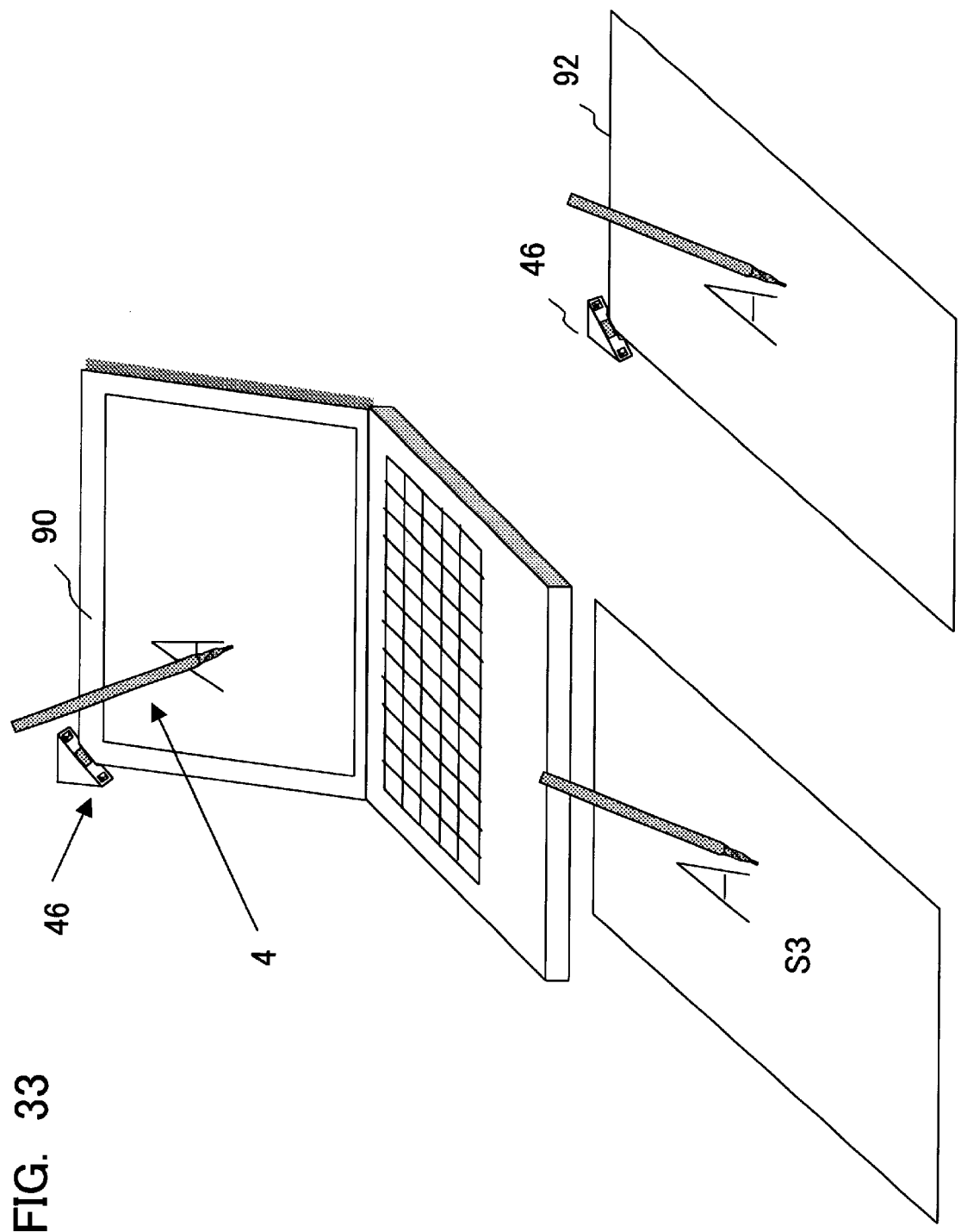
FIG. 33 is a view showing an example of using the receiving unit of FIG. 32.

FIG. 33 is a view showing an example of using the receiving unit of FIG. 32. The receiving unit 46 is attached to a left upper corner of a display panel 90 of the note-type PC by utilizing the clip. The angular part of the display panel 90 matches the butt edge 84, to facilitate the positioning. Thus, it becomes possible to make the pen input on the display plane S1 and the write-down plane S3. Furthermore, the receiving unit 46 is attached to the left upper corner of a write-down paper 92, whereby even if the write-down paper 92 is misaligned, as the receiving unit 46 is fixed, it is unnecessary to carry out calibration anew. Incidentally, when the user of the input pen is left-handed, it is preferable that the receiving units 46 are attached to a right upper corner of the display panel and the right upper corner of the write-down paper, respectively. By so doing, it is prevented that the ultrasonic pulses or infrared rays are shielded by a hand carrying the input pen.

Figures 34A, 34B:
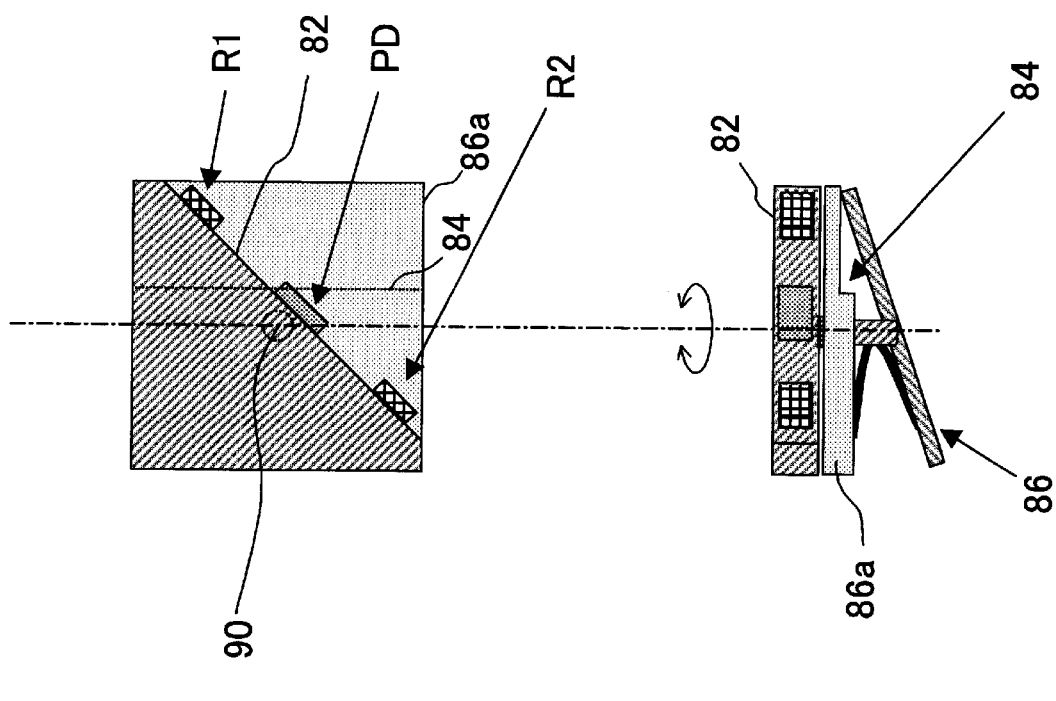
FIG. 34 is a configurational view of another receiving unit.

FIG. 34 is a configurational view of another receiving unit. FIG. 34A is a plane view, and FIG. 34B is a side view. This receiving unit is characterized in that the body 82 is provided with the ultrasonic receivers R1, R2 and the infrared rays receiver (photo-detector PD), and has a substantially triangular shape, and is attached to a clip body 86a so as to rotate around a rotary axis 90. The clip body 86a has a substantially square, and part of its angular part is processed thinly, so that the butt edge 84 is formed in a straight line with respect to the clip body 86a. As the butt edge 84 is formed as a linear shape, it becomes possible to attach the receiving unit to a side face of the display panel or a side face of the write-down paper.

Figure 35A:
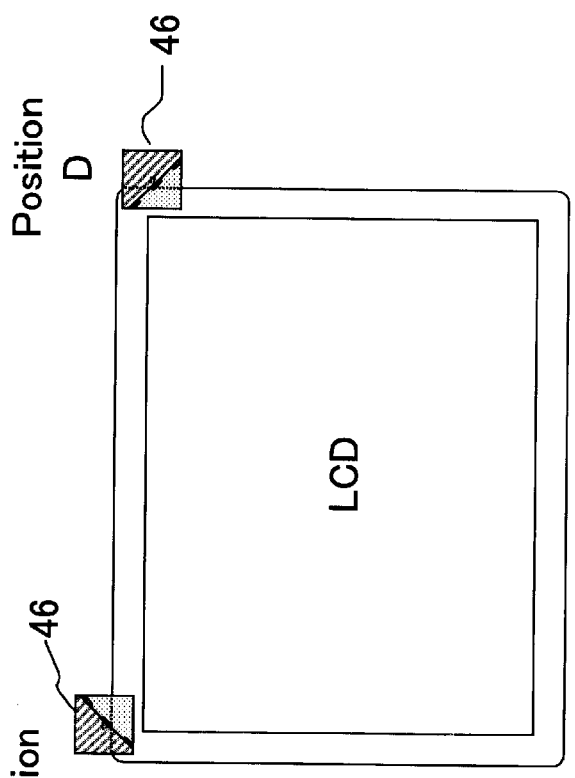
FIG. 35 is a view showing a state that the receiving unit is attached to a liquid crystal display panel.
Figure 35B:
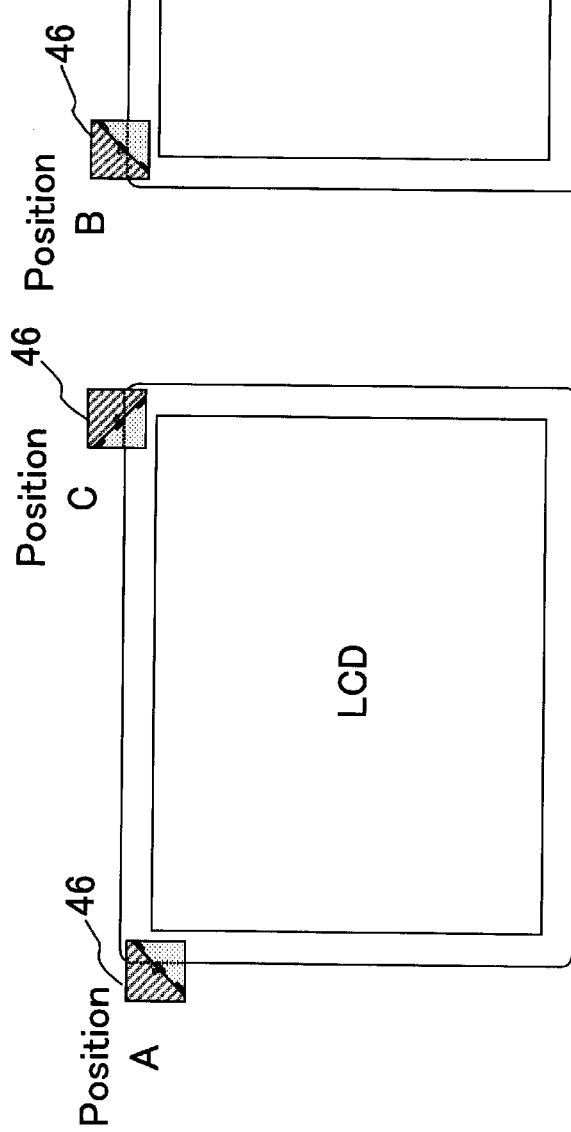
Figure 36D:
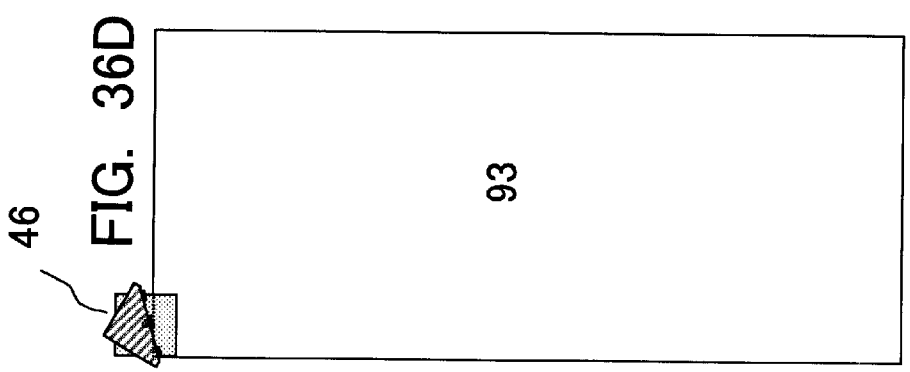
FIG. 36 is a view showing a state that the receiving unit is attached to a write-down paper.
Figure 36C:
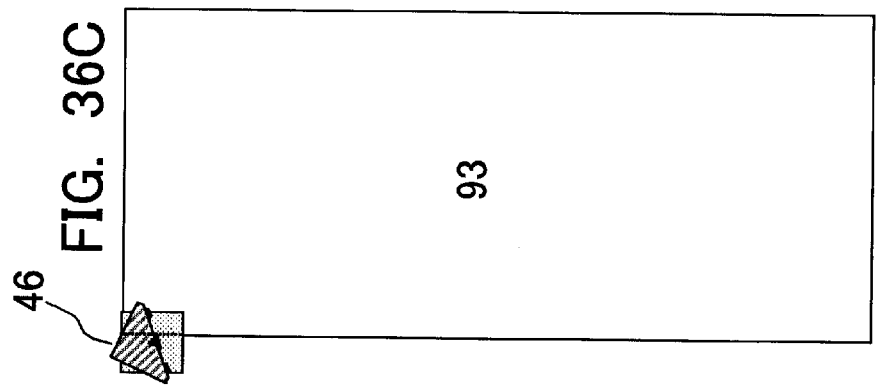
Figure 36A:
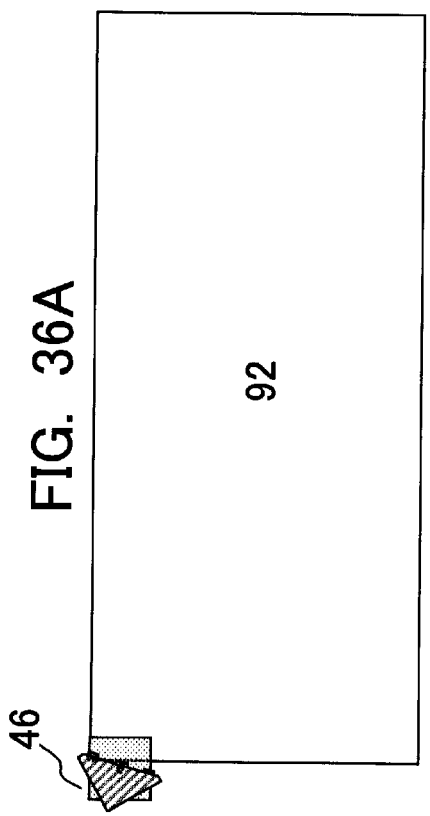
Figure 36B:
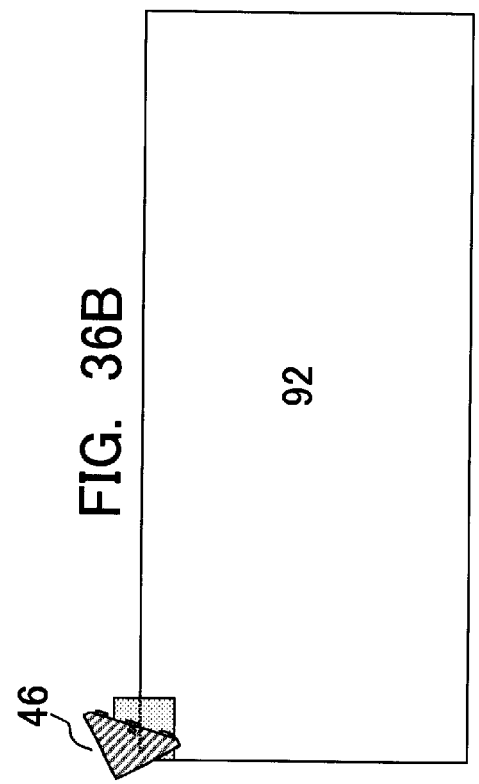

FIG. 35 is a view showing a state that the receiving unit is attached to the liquid crystal display panel. The receiving unit is attached to an upper part on a left side (position A) and a left part on an upper side (position B) of the display panel, whereby the infrared rays or ultrasonic waves from the input pen retained by the right-handed user can be received. However, the position A and the position B differ at 90° in position of the receiving unit body 82 with respect to the clip body. Similarly, the receiving unit is attached to a right part on an upper side (position C) and an upper part on a left side (position D) of the display panel, whereby the infrared rays or ultrasonic waves from the input pen retained by the left-handed user can be received. However, in this case also, the position of the receiving unit body 82 with respect to the clip body differs at 90° between the position C and the position D. In either case, it is desirable that a rotary direction is adjusted so that the line connecting the two ultrasonic receivers is formed at substantially 45° with respect to the input plane, in increasing precision of the input coordinates.

FIG. 36 is a view showing a state that the receiving unit is attached to a write-down paper. FIG. 36A is an example in which the receiving units 46 are attached to an upper part on a left side and a left part on an upper side of an oblong paper plane 92, respectively. In either case, the receiving unit body is appropriately rotated with respect to the clip body and is set so as to direct the planes of the two ultrasonic receivers to their oblong direction. Furthermore, FIGS. 36C and 36D are an example in which the receiving units are attached to a longwise paper plane 93, respectively, and in this case also, the receiving unit body is appropriately rotated and is adjusted so as to direct the plane of the ultrasonic receiver to their longwise direction.

The above input pen has the ultrasonic transmitter, and is provided with the ultrasonic receiver on the receiving unit side. However, when the ultrasonic receiver is provided on the input pen side and the two ultrasonic transmitters are provided in the unit attached to the input plane also, similarly, the coordinate input can be effected.

As set forth hereinabove, according to the present invention, as the coordinate input device capable of making the coordinate input from the plurality of input planes can be configured by the synchronizing means and the two ultrasonic receivers, it is possible to reduce cost.

As set forth hereinabove, a scope of protecting the present invention is not limited to the above embodiments, but extends the present invention mentioned in the scope for a patent and its equivalents.

What is claimed is:

1. A coordinate input apparatus capable of making a coordinate input from a plurality of input planes, comprising:

an input device having an ultrasonic transmitter;

two ultrasonic receivers which are aligned in a direction not perpendicular to the plurality of input planes and receives ultrasonic waves transmitted from the ultrasonic transmitter;

a synchronizing means for synchronizing the input device with the ultrasonic receiver;

an input plane setting part for setting a positional relation between the two ultrasonic receivers and the plurality of input planes; and an input coordinate generator which generates each distance from the input device to the two ultrasonic receivers in accordance with propagation time intervals from the input device to the two ultrasonic receivers of an ultrasonic signal to be received by the ultrasonic receivers, and generates input coordinates in a plurality of the set input planes in accordance with the corresponding two distances.

2. A coordinate input apparatus according to claim 1, wherein the input plane setting part sets coordinate values of the two ultrasonic receivers with respect to each of the plurality of input planes, in a three-dimensional coordinate system when a two-dimensional coordinate (X, Y) is taken on the input plane and a third coordinate axis (Z) is taken in a direction perpendicular to the input plane, and the input coordinate generator generates first coordinate values of the input device in the three-dimensional coordinate system in accordance with the two distances.

3. A coordinate input apparatus according to claim 2, wherein the input plane setting part generates the coordinate values of the two ultrasonic receivers in response to ultrasonic transmission from the input device at three points having known two-dimensional coordinate on the input plane.

4. A coordinate input apparatus according to claim 2, wherein the input plane setting part sets a relation between the two-dimensional coordinate system in the input plane and a two-dimensional coordinate system in a display screen, and the input coordinate generator generates a second coordinate value in the two-dimensional coordinate system in the display screen in accordance with the relation from the first coordinate value, and outputs the corresponding second coordinate value as an input coordinate.

5. A coordinate input apparatus according to claim 4, wherein
the input plane setting part generates the relation between the two-dimensional coordinates of the input plane and display screen in response to ultrasonic transmission from the input device at three points in the input plane which corresponds to the predetermined three points in the display screen.

6. A coordinate input apparatus according to claim 1, wherein
the plurality of input planes to be set are limited to positions where distances from the ultrasonic receivers are different respectively, and
the input coordinate generator specifies the input plane to be input by the input device in accordance with the distance from the input device positioned on the input plane to the ultrasonic receiver, to generate the input coordinate of the input device.

7. A coordinate input apparatus according to claim 1, wherein
the synchronizing means has a synchronizing ultrasonic receiver which receives an ultrasonic signal transmitted from the input device and is located at known position in a three-dimensional coordinate, and
the input coordinate generator generates a position in the three-dimensional coordinate of the input device in accordance with a first difference between time intervals when the ultrasonic signal transmitted from the input device propagates to either one of the two ultrasonic receivers and the synchronizing ultrasonic receiver; and a second difference between time intervals when the ultrasonic signal transmitted from the input device propagates to either one of the two ultrasonic receivers and the synchronizing ultrasonic receiver.

8. A coordinate input apparatus according to claim 1, wherein
the two ultrasonic receivers is capable of being located in the plane of a display screen of a computer, and
the plurality of input planes contain at least the display screen and a first plane mounting the corresponding display screen.

9. A coordinate input apparatus capable of making a coordinate input from a plurality of input planes, comprising:
an input device having an ultrasonic receiver;
two ultrasonic transmitters which are aligned in a direction not perpendicular to the plurality of input planes and transmit ultrasonic waves to the ultrasonic receiver;
a synchronizing means for synchronizing the input device with the ultrasonic transmitter;
an input plane setting part for setting a positional relation between the two ultrasonic transmitters and the plurality of input planes; and
an input coordinate generator which generates each distance from the input device to the two ultrasonic transmitters in accordance with propagation time intervals from the two ultrasonic transmitter to the input device of an ultrasonic signal to be received by the ultrasonic receivers, and generates input coordinates in a plurality of the set input planes in accordance with the corresponding two distances.

10. A coordinate input apparatus according to claim 9, wherein
the input plane setting part sets coordinate values of the two ultrasonic transmitters with respect to each of the plurality of input planes, in a three-dimensional coordinate system in which a two-dimensional coordinate (X, Y) is taken on the input plane and a third coordinate axis (Z) is taken in a direction perpendicular to the corresponding input plane, and
the input coordinate generator generates coordinate values of the input device in the three-dimensional coordinate system in accordance with the two distances.

11. A coordinate input apparatus according to claim 1, wherein
the input device comprises:
a pen-type body;
a first input core which is provided at a front end of the body to have a first pull-in stroke, and has a write-down means which is capable of writing down on the input plane; and
a second input core which is provided at the front end or the other end of the body to have a second pull-in stroke longer than the first pull-in stroke longer than the first pull-in stroke, and comes into contact with the input plane when pulled in, under a weaker pushing pressure than the first input core.

12. A coordinate input apparatus according to claim 1, wherein
a clip for pinching an input plane material is provided in a receiving unit having the two ultrasonic receivers, and the receiving unit is fixed to one end of the input plane material.

13. A coordinate input apparatus according to claim 9, wherein
a clip for pinching an input plane material is provided in a transmitting unit having the two ultrasonic transmitters, and the transmitting unit is fixed to one end of the input plane material.

14. A coordinate input apparatus for inputting input coordinates to a computer from a plurality of input planes including at least a display panel plane and a write-down plane by transmitting/receiving ultrasonic waves, further comprising:
a pen-type input device; and
a receiving unit for transmitting/receiving ultrasonic waves with the input device, wherein
the input device comprises:
a pen-type body;
a first input core which is provided at a front end of the body to have a first pull-in stroke, and has a write-down means which is capable of writing down on the input plane; and
a second input core which is provided at the front end or the other end of the body to have a second pull-in stroke longer than the first pull-in stroke, and comes into contact with the input plane when pulled in, under a weaker pushing pressure than the first input core.

15. A coordinate input apparatus according to claim 14, wherein
the ultrasonic transmitters are provided at the front end and the other end of the body, respectively, and when the first or second core comes into contact with the input plane, the two ultrasonic transmitters transmit alternately ultrasonic waves.

16. A coordinate input apparatus according to claim 14, wherein the first input core and second input core are exchangeably attached at the front end part of the body.

17. A coordinate input apparatus according to claim 14, wherein the first input core is attached to the front end part of the body, and the second input core is attached detachably to a position of the front end of the first input core.

18. A coordinate input apparatus according to claim 14, wherein the first input core and second input core are provided in parallel inside the body, and one input core projects to the front end part of the body and the other input core is pulled in more than the one input core.

19. A coordinate input apparatus according to claim 14, wherein the first input core and second input core are provided coaxially inside the body, and one input core projects to the front end part of the body and the other input core is pulled in more than the one input core.

20. A coordinate input apparatus according to claim 19, wherein either one input core projects in accordance to an inclination of the body.

* * * * *